(12) United States Patent
Li et al.

(10) Patent No.: US 11,994,687 B2
(45) Date of Patent: May 28, 2024

(54) META-OPTICS FOR VIRTUAL REALITY AND AUGMENTED REALITY SYSTEMS

(71) Applicants: PRESIDENT AND FELLOWS OF HARVARD COLLEGE, Cambridge, MA (US); TRUSTEES OF BOSTON UNIVERSITY, Boston, MA (US)

(72) Inventors: Zhaoyi Li, Cambridge, MA (US); Yao-Wei Huang, Cambridge, MA (US); Peng Lin, Boston, MA (US); Ji-Xin Cheng, Boston, MA (US); Federico Capasso, Cambridge, MA (US)

(73) Assignees: PRESIDENT AND FELLOWS OF HARVARD COLLEGE, Cambridge, MA (US); TRUSTEES OF BOSTON UNIVERSITY, Boston, MA (US)

( * ) Notice: Subject to any disclaimer, the term of this patent is extended or adjusted under 35 U.S.C. 154(b) by 591 days.

(21) Appl. No.: 17/308,905

(22) Filed: May 5, 2021

(65) Prior Publication Data
US 2021/0356754 A1 Nov. 18, 2021

Related U.S. Application Data

(60) Provisional application No. 63/024,358, filed on May 13, 2020.

(51) Int. Cl.
*G02B 27/01* (2006.01)
*G02B 1/00* (2006.01)
(Continued)

(52) U.S. Cl.
CPC ....... *G02B 27/141* (2013.01); *G02B 27/4227* (2013.01); *G06T 19/006* (2013.01)

(58) Field of Classification Search
CPC ............ G02B 27/4227; G02B 27/4211; G02B 27/0101; G02B 27/4216; G02B 2027/011; G02B 1/002; G02B 27/0172
See application file for complete search history.

(56) References Cited

U.S. PATENT DOCUMENTS

2012/0194419 A1 8/2012 Osterhout et al.
2014/0177023 A1 6/2014 Gao et al.
(Continued)

OTHER PUBLICATIONS

Accmoglu, A. et al., "Design and Control of a Magnetic Laser Scanner for Endoscopic Microsurgeries", IEEE/ASME Transactions on Mechatronics, vol. 24, No. 2, pp. 527-537, Apr. 2019, 11 pages.
(Continued)

*Primary Examiner* — Ryan D Howard
(74) *Attorney, Agent, or Firm* — FOLEY & LARDNER LLP

(57) ABSTRACT

A display system includes an optical device configured according to constructive interference for a plurality of wavelengths at a focal length. The display system includes a fiber. The display system includes a controller configured to scan the fiber using a Lissajous scanning method to generate a display. The display can be disposed within a focal plane of the optical device. The controller is configured to modulate light intensity from the fiber. The controller can be configured to form a display image that passes through the optical device. The display system can include an optical combiner configured to reflect the display image from the optical device and form a virtual image. The optical device can be configured to magnify a display image from the display and form a virtual image.

20 Claims, 23 Drawing Sheets

(51) Int. Cl.
  *G02B 27/14* (2006.01)
  *G02B 27/42* (2006.01)
  *G06T 19/00* (2011.01)

(56) References Cited

U.S. PATENT DOCUMENTS

| | | | |
|---|---|---|---|
| 2015/0241698 A1* | 8/2015 | Schowengerdt | G02B 26/0808 345/633 |
| 2015/0268415 A1 | 9/2015 | Schowengerdt et al. | |
| 2015/0309263 A2 | 10/2015 | Abovitz et al. | |
| 2017/0010488 A1* | 1/2017 | Klug | G02B 27/4272 |
| 2018/0052277 A1 | 2/2018 | Schowengerdt et al. | |
| 2018/0252857 A1 | 9/2018 | Glik et al. | |

OTHER PUBLICATIONS

Arbabi, A. et al., "Miniature optical planar camera based on a wide-angle metasurface doublet corrected for monochromatic aberrations", Nature Communications, vol. 7, Nov. 28, 2016, 9 pages.

Beams, R. et al., "Transverse chromatic aberration in virtual reality head-mounted displays", Optics Express, vol. 27 No. 18, Sep. 2, 2019, 8 pages.

Bertin, H. et al., "Correlated Disordered Plasmonic Nanostructures Arrays for Augmented Reality", ACS Photonics, 5, 7, May 11, 2018, pp. 2661-2668, 8 pages.

Chen, B. et al.; "GaN Metalens for Pixel-Level Full-Color Routing at Visible Light", Nano Letters, 17, 10, Sep. 11, 2017, pp. 6345-6352, 8 pages.

Chen, W. et al., "A broadband achromatic metalens for focusing and imaging in the visible," Nature Nanotechnology, vol. 13, Mar. 2018, pp. 220-226, 8 pages.

Faisal, A., "Visionary of virtual reality", Nature, vol. 551, Nov. 16, 2017, pp. 298-299, 2 pages.

Furht, B. (Ed.), "Handbook of Augmented Reality", Springer, undated, copyright 2011, 753 pages.

Groever, B. et al., "Meta-Lens Doublet in the Visible Region" Nano Letters, 17, 8, Jun. 27, 2017, pp. 4902-4907, 6 pages.

Hu, T. et al., "Demonstration of a-Si metalenses on a 12-inch glass wafer by CMOS-compatible technology", Jun. 2019, 6 pages.

Hua, H. et al., "A 3D integral imaging optical see-though head-mounted display", Optics Express, vol. 22 No. 11, Jun. 2, 2014, pp. 13484-13491, 8 pages.

Hwang, K. et al., "Frequency selection rule for high definition and high frame rate Lissajous scanning", Scientific Reports, 7:14075, Oct. 26, 2017, 8 pages.

Khorasaninejad, M. et al., "Metalenses at visible wavelengths: Diffraction-limited focusing and subwavelength resolution imaging," Science, vol. 352 Issue 6290, Jun. 3, 2016, 6 pages.

Khorasaninejad, M. et al., "Metalenses: Versatile multifunctional photonic components," Science 358, 1146, Dec. 1, 2017, 10 pages.

Kildishev, A. et al., "Planar Photonics with Metasurfaces", Science, vol. 339, Mar. 15, 2013, 8 pages.

Kirchhoff, G., "Zur Theorie der Lichtstrahlen", Annalen der Physik, vol. 254 Issue 4, 1883 (undated), pp. 663-695, 33 pages.

Lan, S. et al., "Metasurfaces for Near-Eye Augmented Reality", ACS Photonics, 6, 4, Mar. 14, 2019, pp. 864-870, 7 pages.

Lee, G. et al., "Metasurface eyepiece for augmented reality", Nature Communications, (2018)9:4562, Nov. 1, 2018, 10 pages.

Lin, D. et al., "Dielectric gradient metsurface optical elements", Science, vol. 345 Issue 6194, Jul. 18, 2014, 6 pages.

Matsuda, T. et al., "Display unit using laser scanning device", Journal of the SID, 26/11, Sep. 2018, pp. 631-640, 10 pages.

O'Shea, D. et al., "Diffractive Optics: Design, Fabrication, and Test", Tutorial Texts in Optical Engineering, vol. TT62, copyright 2004, Downloaded From: https://www.spiedigitallibrary.org/ebooks on May 9, 2021, 13 pages.

Paavilainen, J. et al., "The Pokemon Go Experience: A Location-Based Augmented Reality Mobile Game Goes Mainstream", CHI 2017, May 6-11, 2017, Denver, CO, USA, 6 pages.

Paniagua-Dominguez, R. et al., "A Metalens with a Near-Unity Numerical Aperture", Nano Letters, 18, 3, Feb. 27, 2018, pp. 2124-2132, 9 pages.

Park, H. et al., "Lissajous fiber scanning for forward viewing optical endomicroscopy using asymmetric stiffness modulation" Optics Express, vol. 22 No. 5, Mar. 10, 2014, 8 pages.

Park, J. et al. "All-Glass, Large Metalens at Visible Wavelength using Deep-Ultraviolet Projection Lithography"; Nano Letters, 19, 12, Nov. 14, 2019, pp. 8673-8682, 10 pages.

Schowengerdt, B. et al., "1-mm Diameter, Full-color Scanning Fiber Pico Projector" SID Symposium Digest of Technical Papers 40.1, Jun. 2009, 4 pages.

Schowengerdt, B. et al., "Miniature Wide-Throw-Angle Scanning Fiber Projection Display", SID Symposium Digest of Technical Papers 39.1, May 2008, 4 pages.

She, A. et al., "Large area metalenses: design, characterization, and mass manufacturing", Optics Express, vol. 26 No. 2, Jan. 22, 2018, 13 pages.

Shrestha, S. et al., "Broadband achromatic dielectric metalenses", Light: Science & Applications (2018)7:85, Nov. 7, 2018, 11 pages.

Tseng, M. et al., "Metalenses: Advances and Applications", Advanced Optical Materials, vol. 6, Issue 18, Sep. 18, 2018, 16 pages.

Wang, S. et al., "A broadband achromatic metalens in the visible," Nature Nanotechnology, vol. 13, Mar. 2018, pp. 227-232, 6 pages.

Yu, N. et al.: "Flat optics with designer metasurfaces", Nature Materials, vol. 13, Feb. 2014, pp. 139-150, 12 pages.

* cited by examiner

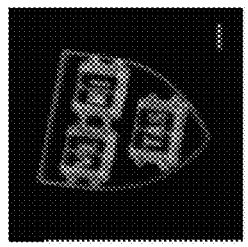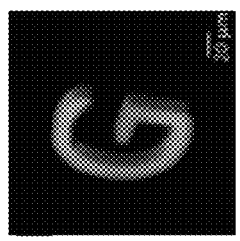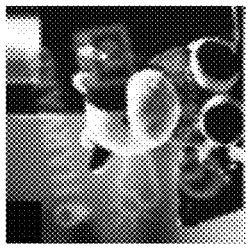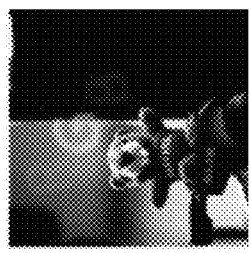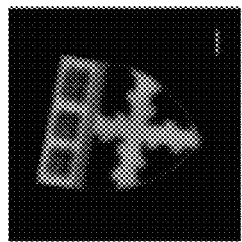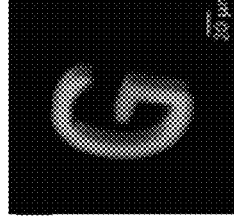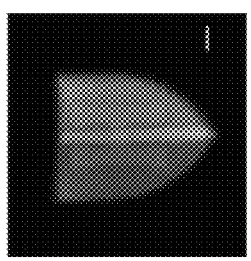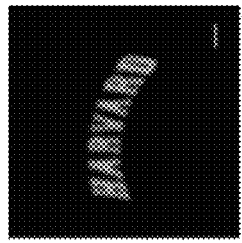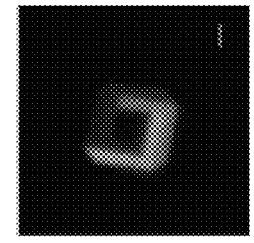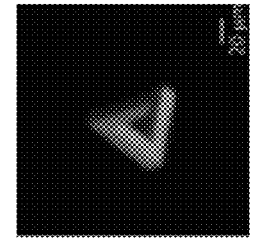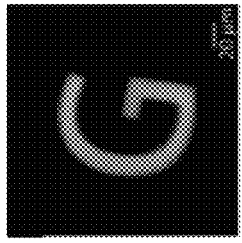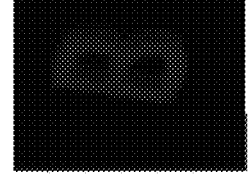

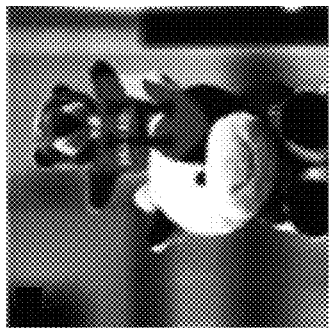
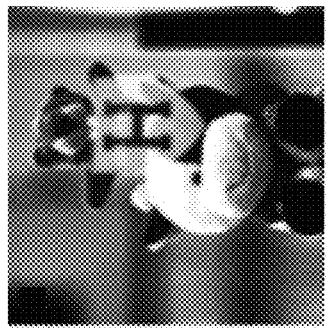
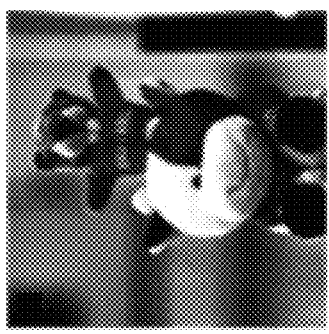
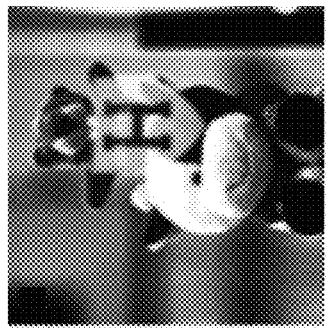
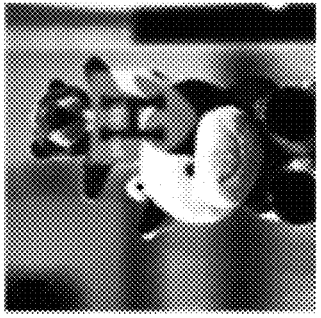
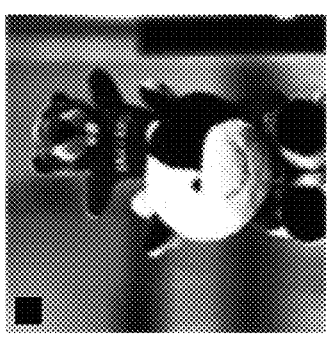
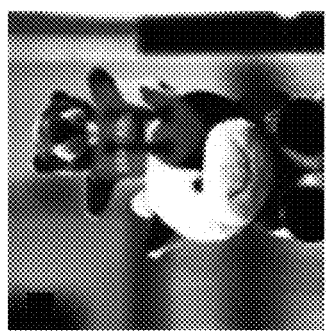
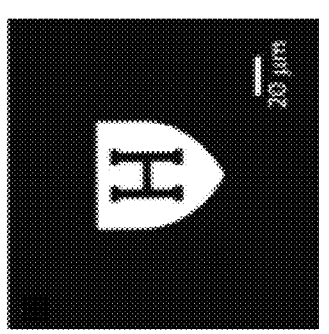
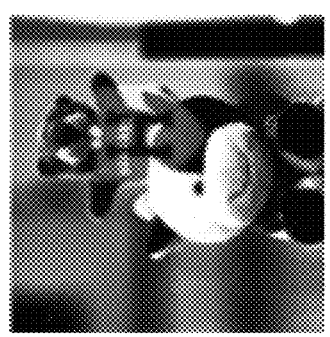

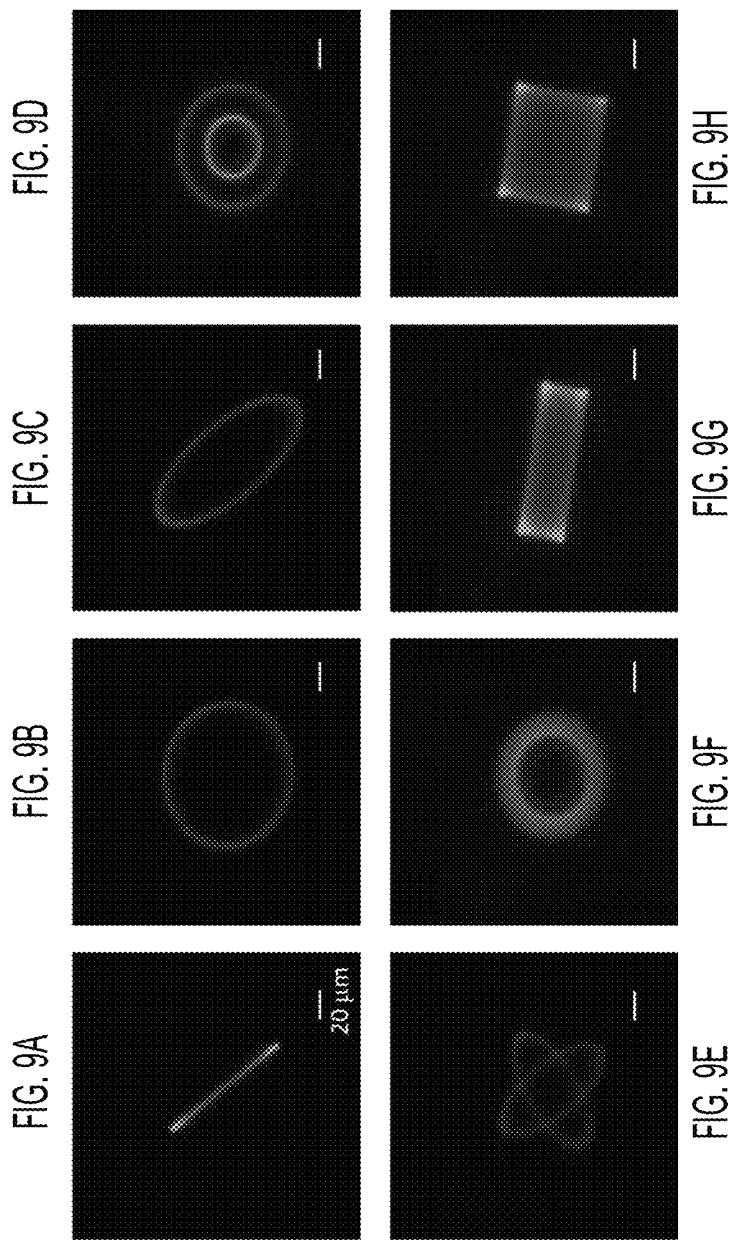

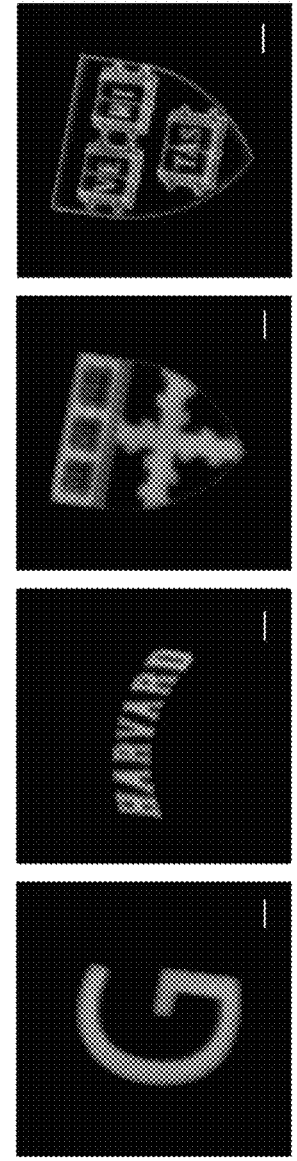

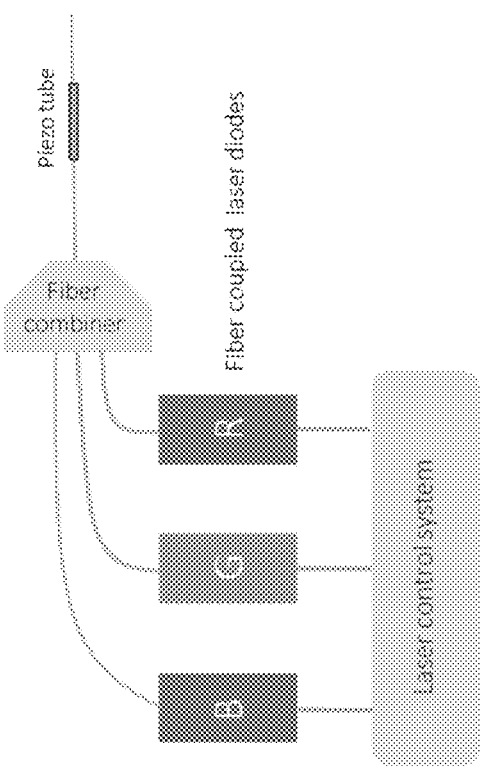
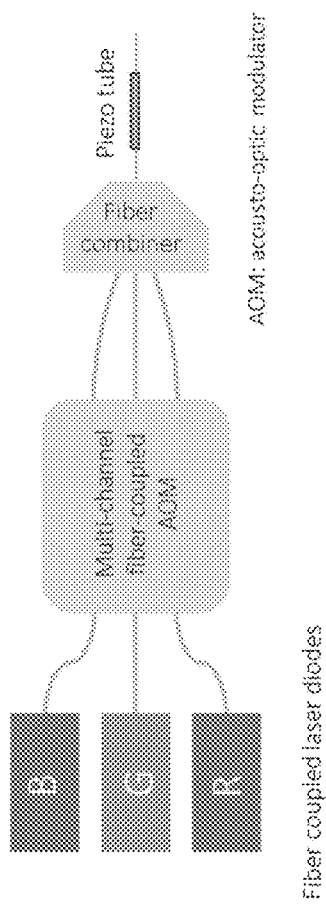
FIG. 15A
FIG. 15B
FIG. 15C

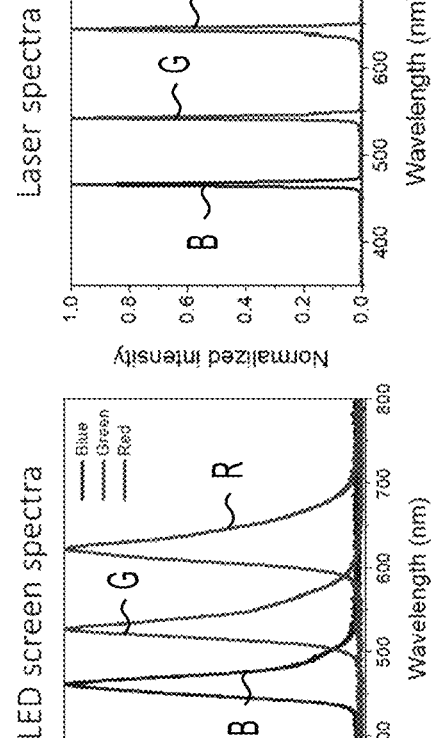
FIG. 19A
FIG. 19B
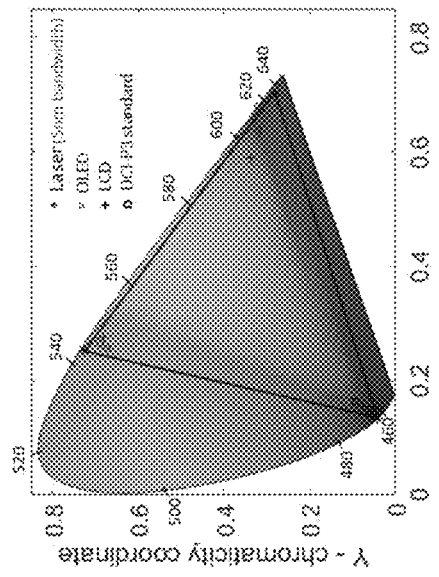
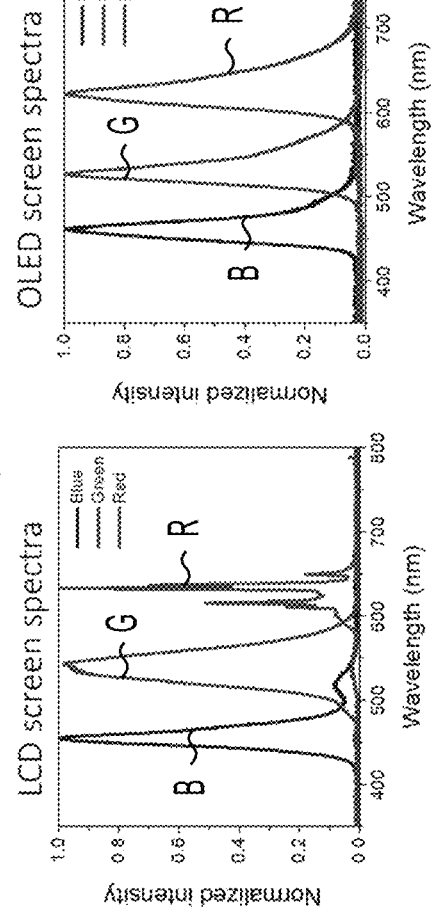
FIG. 19C
FIG. 19D
FIG. 19E

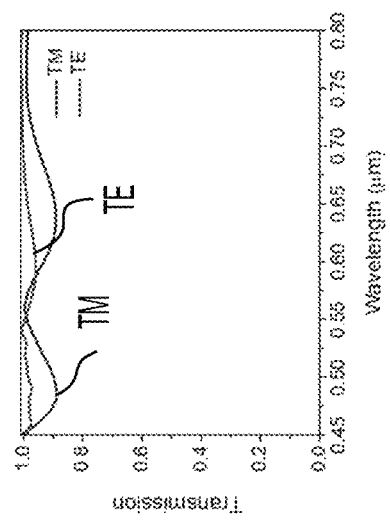
FIG. 20C
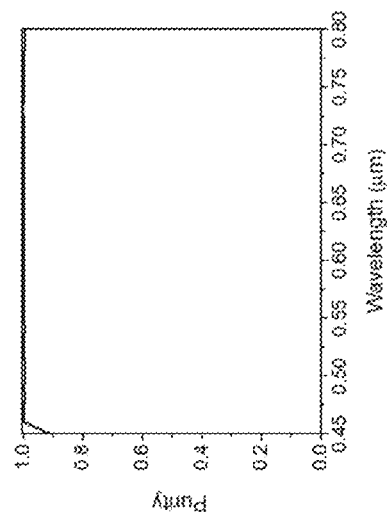
FIG. 20E
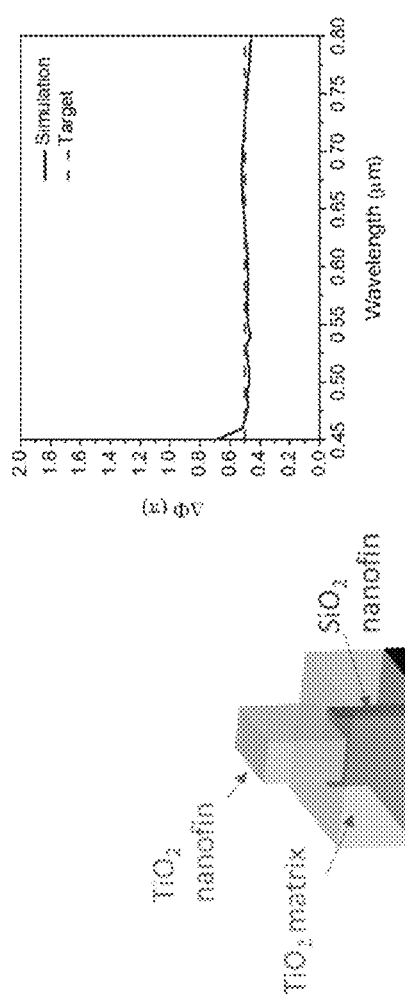
FIG. 20B
FIG. 20D
FIG. 20A
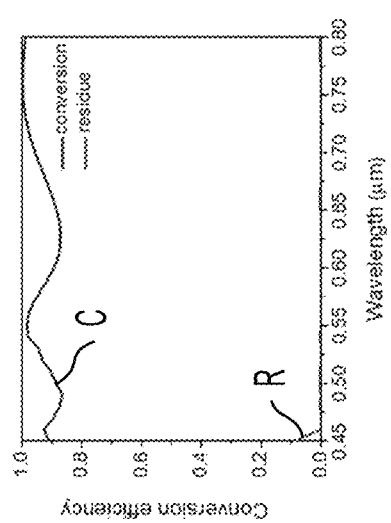

META-OPTICS FOR VIRTUAL REALITY AND AUGMENTED REALITY SYSTEMS

CROSS-REFERENCE TO RELATED APPLICATIONS

The present application claims the benefit of and priority to U.S. Provisional Application No. 63/024,358, filed May 13, 2020, which is hereby incorporated by reference herein in its entirety.

BACKGROUND

Virtual reality (VR) and augmented reality (AR) have evolved from science-fiction concepts into influential technologies that change lives in various ways. Virtual reality is a technology that creates an immersive experience by replacing reality with an imaginary world, and augmented reality aims to blend virtual—with real-world scenes. Current virtual reality and augmented reality devices suffer from large form factor and poor imaging quality due to the bottlenecks imposed by optics.

SUMMARY

A meta-optics-based compact virtual reality and augmented reality system that produces full-color, high-resolution virtual-reality images and integrates virtual objects with real-world scenes, respectively, is disclosed. To realize that, a system is provided which includes a full-color fiber scanning display that is realized by moving a fiber tip through a piezo tube and modulating the incident laser beam in synchrony. The fiber tip is scanning according to a Lissajous scanning method. The fiber scanning display features high resolution, large color gamut, and high dynamic range.

At least one aspect of the present disclosure is directed to display system. The display system includes an optical device configured according to constructive interference for a plurality of wavelengths at a focal length. The display system includes a fiber. The display system includes a controller configured to scan the fiber using a Lissajous scanning method to generate a display. The display is disposed within a focal plane of the optical device. The controller is configured to modulate light intensity from the fiber. The optical device is configured to magnify a display image from the display and form a virtual image.

Another aspect of the present disclosure is directed to a display system. The display system includes an optical device configured according to constructive interference for a plurality of wavelengths and a focal length. The display system includes a fiber. The display system includes a controller configured to scan an end of the fiber using a Lissajous scanning method to generate a display. The controller is configured to modulate light intensity from the fiber. The controller is configured to form a display image that passes through the optical device. The display system includes an optical combiner configured to reflect the display image from the optical device and form a virtual image.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 2A-2P illustrate virtual reality and augmented reality demonstration using an achromatic metalens and a fiber scanning display, according to some embodiments.

FIGS. 7A-7K illustrate augmented reality images of merged virtual objects and a real-world scene, according to an embodiment.

FIGS. 9A-9H illustrate examples of geometric patterns formed by the fiber scanning display without modulation of the incident light, according to some embodiments.

FIGS. 10A-10L illustrate virtual reality results of patterns formed by the fiber scanning display with a Lissajous scanning method, according to some embodiments.

FIGS. 15A-15C illustrate schematics of a fiber scanning display system based on fiber optics, according to some embodiments.

FIG. 19A illustrates a CIE 1931 chromaticity diagram comparing color gamut of a laser-based display, an OLED display, and an LCD display, according to an embodiment. FIG. 19B illustrates calculated chromaticity coordinates of blue, green, and red light sources of different displays as shown in FIG. 19A, according to an embodiment. FIGS.

19C-19E illustrate measured RGB light emission spectra of an LCD screen, an OLED screen, and a laser, according to an embodiment.

FIG. 20A illustrates a schematic of a unit cell of a metasurface-based achromatic quarter waveplates (QWP), according to an embodiment. FIG. 20B illustrates retardance between two orthogonal axes (transverse electric (TE) and transverse magnetic (TM)) as wavelength in the visible band, according to an embodiment. FIG. 20C illustrates transmission spectra of two orthogonal polarization (TE and TM), according to an embodiment. FIG. 20D illustrates conversion efficiency and residues of the QWP, according to an embodiment. FIG. 20E illustrates polarization purity of the output beam after passing through the QWP over the visible band, according to an embodiment.

Figure 21B:
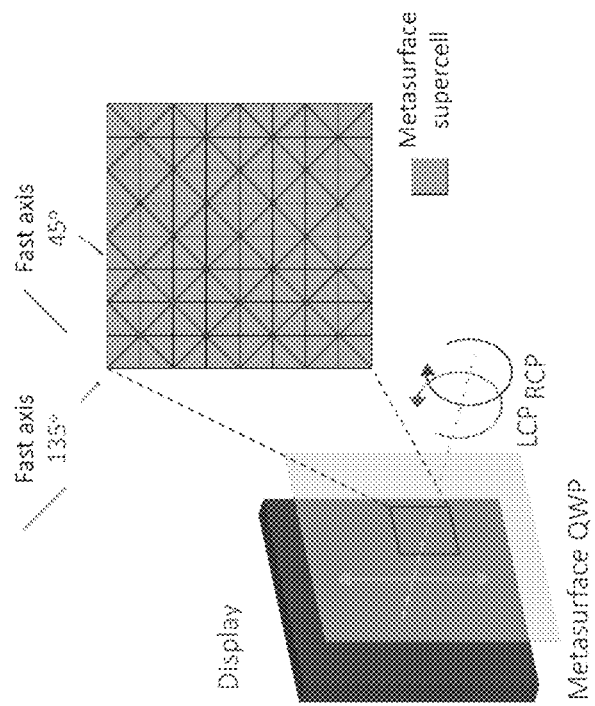
Figure 21A:
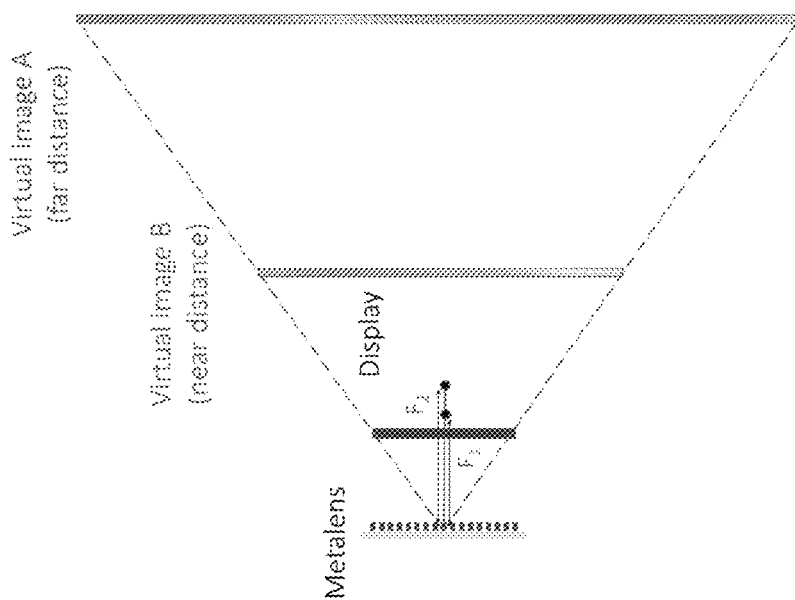

FIG. 21A illustrates a schematic of a solution to an AR system that accommodates eye's depth of cue for near and far distances, according to an embodiment. FIG. 21B illustrates details of a display, according to an embodiment.

Figure 22:
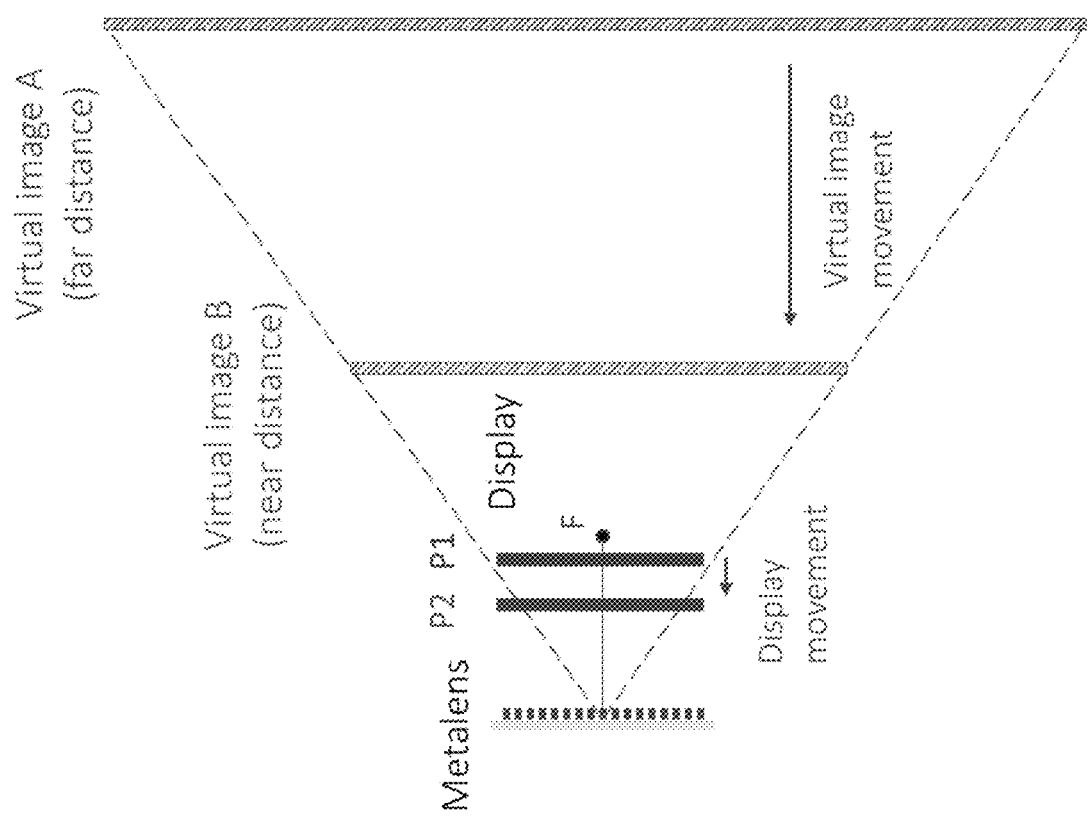

FIG. 22 illustrates a schematic of an AR system component that helps accommodate an eye's depth of cue, according to an embodiment.

Like reference numbers and designations in the various drawings indicate like elements.

DETAILED DESCRIPTION

Breakthroughs in VR and AR technologies have attracted attention from the scientific community as well as industry, and have also stimulated interests of the general public. However, the widespread use of VR/AR devices is hindered by the development of optical elements such as lenses. Unlike electronics that continuously reduce in size following Moore's law, the form factor of optical elements has hardly changed. As a result, the current VR/AR devices are bulky, heavy, and hard to wear. Moreover, a compound lens and freeform optics that are commonly seen in commercial products design and research prototypes further increase device footprint, complexity, cost, and fabrication difficulties. Chromatic aberration from poor-quality lenses is another issue that compromises viewing experience especially in the VR devices where only singlet lenses are used. Besides challenges in the optical architecture, a desirable VR/AR display that has small pixel size, wide color gamut, and high brightness is still under exploration.

As discussed herein, metasurfaces can be a platform for novel flat optics. Metasurfaces are arrays of manufactured nanostructures assembled on a subwavelength scale that can mold incident electromagnetic wavefronts. Metalenses, in particular, can address the challenges of conventional optics. Fundamentally different from classic lenses, a metalens is optically thin and light. A metalens can control the phase, amplitude and polarization state of incident light with subwavelength resolution. High numerical aperture (NA) can be achieved in metalenses. Metalenses can work in the visible band and can operate over broad bandwidth by locally engineering waveguide modes of meta-atoms to compensate material dispersion. Large-scale chromatic metalenses can be mass-produced via CMOS-compatible fabrication techniques. The unique merits of metalenses can address the challenges of current VR/AR systems.

A large RGB-achromatic metalens and a compact VR/AR system based on the RGB-achromatic metalens is disclosed. One common issue of conventional optical lenses is chromatic aberration. The chromatic aberration of a refractive lens originates from the intrinsic material dispersion that causes longer wavelengths to focus at longer focal distance. In comparison, the focusing of a diffractive lens (e.g., Fresnel lens) is more than ten times as dispersive. Such severe chromaticity can be due to phase discontinuities at zone boundaries and results in longer focal distances for shorter wavelengths. The metalens can correct refractive and diffractive type of chromatic aberration by dispersion engineering and zone interference engineering, respectively. To compensate material dispersion, the effective refractive index of the metalens can be spatially engineered by employing meta-atoms that can independently control phase and dispersion (e.g., group delay, group delay dispersion, etc.). A phase profile can include a representation (e.g., graphic, plot, relationship) of a phase of a periodic function of a variable. A dispersion profile can include a representation (e.g., graphic, plot, relationship) of dispersion (e.g., group delay, group delay dispersion, etc.). However, such an approach may limit the diameter of the metalens to tens of microns for NA of 0.1-0.2 because the maximum group delay is approximately proportional to the product of lens diameter and NA.

Figure 1C:
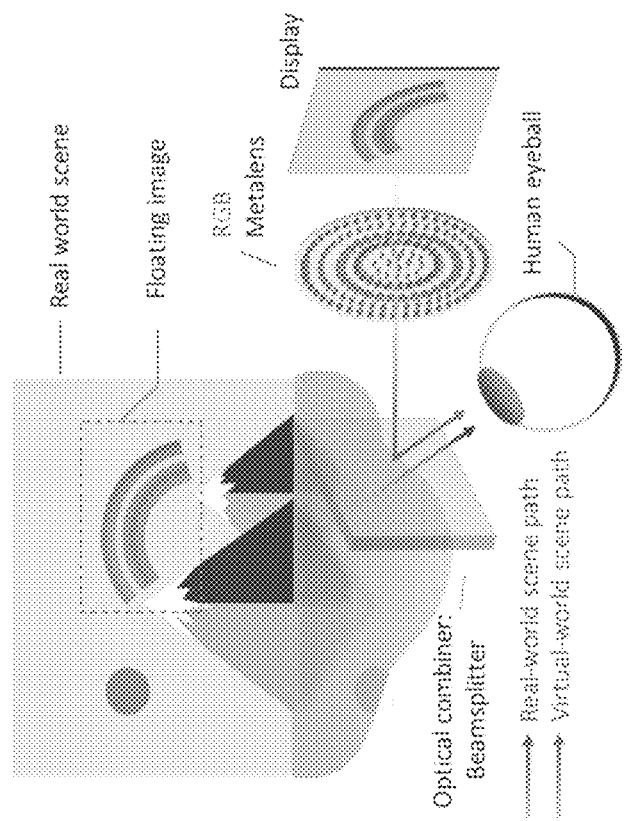
FIGS. 1A-1C illustrate schematics of a virtual reality system and an augmented reality system based on the RGB-achromatic metalens, according to some embodiments.
Figure 1A:
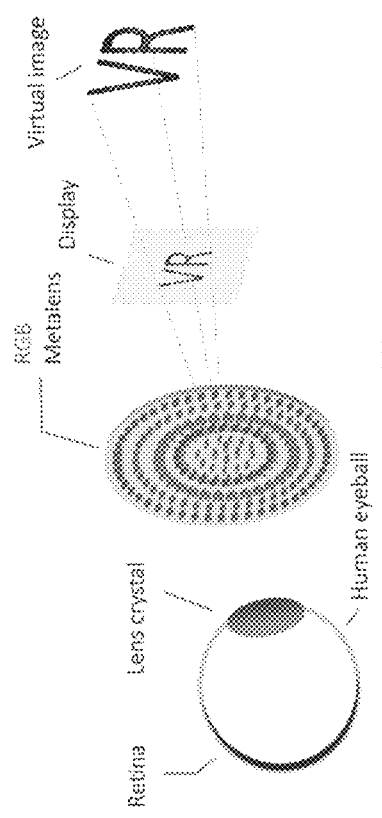
Figure 1B:
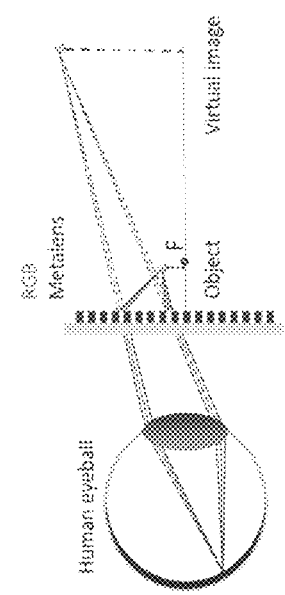

In some embodiments, a compact VR and AR system includes the RGB-achromatic metalens. FIG. 1A shows a schematic of the VR system. An achromatic metalens is placed in front of an eyeball and a display is placed within the focal plane of the metalens. The images shown on the display can be magnified by the metalens, focused onto retina through eye lens crystal, and form virtual images. In the experiment, a tube lens is used to mimic the eye lens crystal and a CMOS camera is used to mimic the retina. FIG. 1D is the cross-sectional view illustrating the VR system working principle. A VR system can include a high numerical aperture and a miniaturized display to allow for larger field of view and small form factor. The AR system as shown in FIG. 1C includes at least three components: a display, an achromatic metalens and an optical combiner (beamsplitter). The AR system has two working modes that allow the mixture of virtual and real world. In the mode of virtual image projection, the images on the display after passing through the metalens can be deflected by the beamsplitter and focused onto the retina through the eye crystal lens forming magnified virtual images, which appear at far distance. In the see-through mode, real-world images can directly pass through the beamsplitter and can project onto the retina. The advantages of the VR/AR system are significant. First, the size, weight, and complexity of the system are greatly reduced by replacing conventional bulky freeform lens modules with a single thin layer metasurface. Second, image quality is greatly improved by an aberration-corrected metalens. Third, real-world images are not perturbed when projecting virtual images.

Figure 2A:
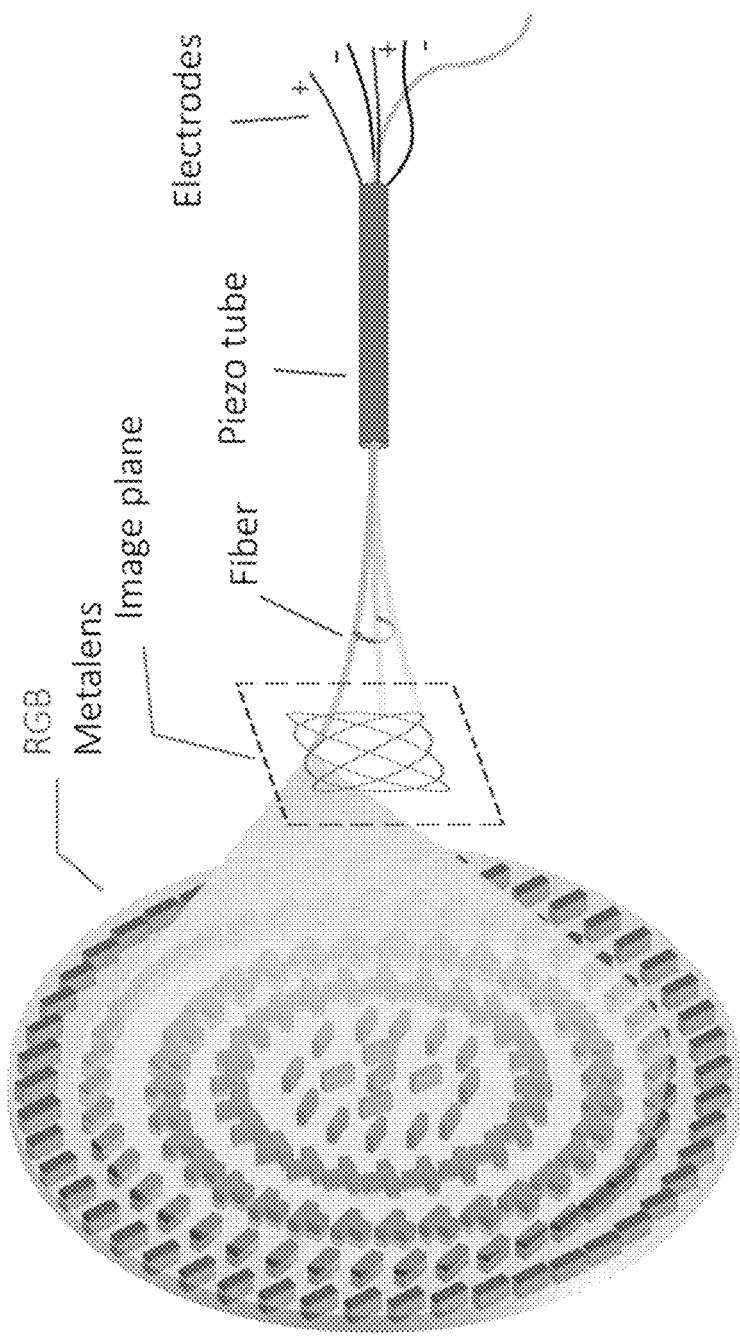

One challenge in current VR/AR technologies is a desired display that offers combined advantages such as miniaturized footprint, high resolution, high dynamic range, etc. In one example embodiment, a passive display is mimicked by using patterned metal masks and laser beam illumination for VR/AR demonstration. In one example embodiment, a fiber scanning method for VR/AR displays is utilized. FIG. 2A depicts the schematic of a fiber scanning display. An optical fiber can be mounted through a piezo actuator tube with the fiber tip positioned a distance L from the piezo actuator tube. An electric signal can be applied to the piezo actuator tube by two pairs of electrodes that were soldered onto the end of the tube. The applied voltage can control the movement of the fiber in two orthogonal directions and thus the trajectory of the fiber tip. The fiber tip can scan in two dimensions and can display patterns when incident light is guided through the optical fiber, thus forming a miniaturized display. The fabricated fiber scanning display can be placed within the focal plane of the metalens. Some geometry patterns can be displayed by controlling the fiber trajectory while keeping the incident light on (e.g., a line, a ring, a circle, an ellipse, etc.) To display arbitrary design patterns, light emission may be modulated as function of time in synchronization with the fiber tip movement. The incident light can be modulated using an acousto-optic modulator and its intensity can be controlled to be on/off by applying two-level voltages in time sequence. The synchronization between the fiber movement and the light emission can be controlled by a control system. Fundamentally different from traditional LCD/LED displays where the pixel number is predefined by the single pixel size, and the display size and the pixels are uniformly distributed in two-dimensional lattices, here the pixel number of the fiber scanning display can be determined by its light modulation speed and the pixel distribution may depend on its scanning method. For example, the scanning method can include a spiral scanning method and Lissajous scanning method. The voltage signals applied onto the two electrodes can be of the following form: $V_{x(y)}(t)=A_{x(y)}(t)\sin(2\pi f_{x(y)}t+\phi_{x(y)})$ where $A_{x(y)}$ is the voltage amplitude in x(y) direction, $f_{x(y)}$ is the modulation frequency, and $\phi_{x(y)}$ is the initial phase. In the Lissajous scanning method, the applied voltage amplitude is kept constant, the scanning frequencies are set different ($f_x \neq f_y$) and the initial phases are the same ($\phi_x=\phi_y$).

The fiber scanning display can include a display system. The display system can include an optical device configured (e.g., selected, determined) according to constructive interference for a plurality of wavelengths at a focal length. For example, the optical device can include a metalens. The optical device can include a first zone comprising a first plurality of nanoscale elements. The first plurality of nanoscale elements can have a first optical dispersion profile and a first orientation. The optical device can include a second zone comprising a second plurality of nanoscale elements. The second plurality of nanoscale elements can have a second optical dispersion profile and a second orientation. The first orientation and the second orientation can be configured according to constructive interference for the plurality of wavelengths and the focal length.

The optical device can be configured according to constructive interference for at least three wavelengths. For example, the optical device can be configured according to constructive interference for wavelengths corresponding to red, green, and blue. The optical device can be configured to magnify a display image from the display and form a virtual image. The virtual image can be located outside of the focal plane of the optical device. The focal plane can include a plane through the focus perpendicular to the axis of the optical device. The virtual image can include the magnified display image. The display can include a physical location of a fiber scanning tip. The display can include a fiber scanning display. The display image can include an image formed by the display.

The display system can include a fiber. The fiber can be coupled to at least 3 different laser sources. For example, the fiber can be coupled to a first laser source, a second laser source, and a third laser source. The first laser source can correspond to red laser light. The second laser source can correspond to green laser light. The third laser source can correspond to blue laser light.

The display system can include a controller. The controller can be configured to scan the fiber using a Lissajous scanning method to generate a display. The display can be generated by vibrating the fiber tip while modulating the intensity of the light transmitted down the fiber core to form a display image. The display can be generated by vibrating the fiber tip using a piezoelectric actuator. The display can be generated by 2D movement of the fiber tip providing light. The display can include the physical location of the fiber scanning tip as the tip. The display can include a device (e.g., fiber) for visual presentation of date (e.g., the display image). The display can be disposed within a focal plane of the optical device. The controller can be configured to apply a voltage (e.g., first voltage) to the first pair of electrodes and a voltage (e.g., second voltage) to a second pair of electrodes. The Lissajous scanning method can include applying, by the controller, a voltage to a first pair of electrodes of the form, $V_x(t)=A_x(t)\sin(2\pi f_x t+\phi_x)$, and applying, by the controller, a voltage to a second pair of electrodes of the form: $V_y(t)=A_y(t)\sin(2\pi f_y t+\phi_y)$, where $A_x$ is a voltage amplitude in an x-direction, $A_y$ is a voltage amplitude in a y-direction, $f_x$ is an x-direction modulation frequency, $f_y$ is an y-direction modulation frequency, $\phi_x$ is a x-direction initial phase, and $\phi_y$ is a y-direction initial phase. In some embodiments, $A_x$ and $A_y$ are constants, the x-direction modulation frequency and the y-direction modulation frequency are different, and the x-direction initial phase and the y-direction initial phase are equal.

The controller can be configured to modulate light intensity from the fiber. The fiber can include a fiber core which transmits light down the length of the fiber. The light can have a varying intensity determined by the controller. The controller can modulate the light intensity at one end of the fiber by activating the pair of electrodes. The controller can be configured to modulate incident light intensity at one end of the fiber using a modulator (e.g., an acousto-optic modulator, an electro-optic modulator, etc.). The incident light can include light that falls (e.g., strikes, hits, etc.) that is directed at the optical device. The one of the fiber can include the end of the fiber that is directed at (e.g., pointed towards) the optical device. The controller can be configured to modulate light intensity by transitioning between (e.g., switching between, oscillating about, etc.) two levels of voltages or multi-levels of voltages. The light intensity can be modulated by applying the multi-level voltage to the modulator.

In some embodiments, the display system includes an optical combiner. The optical combiner can be configured to reflect the display image from the optical device and form a virtual image. The optical combiner can be configured to allow a real-world image to pass through the optical combiner. The controller can be configured to form a display image that is projected onto surface(s) of the optical device, and passes through the optical device.

In some embodiments, the display system includes a piezo actuator tube and a pair of electrodes connected (e.g., coupled) to the piezo actuator tube. The fiber can be disposed within the piezo actuator tube. The controller can be configured to apply a voltage to the pair of electrodes to configure a position of at least one end of the fiber. For example, controller can configure the position of one end of the fiber to follow a Lissajous pattern.

Four imaging examples consisting of 1 mega pixel using green incident light in a VR setup are shown in FIGS. 2B-2E. From the virtual images captured by the camera, the light intensity distribution is quite uniform, and the image resolution is reasonably high. Furthermore, greyscale imaging that creates a 3D effect is demonstrated by applying a multi-level voltage to the acoustic-optic modulator. FIGS. 2F and 2G show a Penrose triangle image with four-level intensity and a Penrose square image with five-level intensity, respectively. A toroid image with continuous intensity variation is also shown in FIG. 2H, which demonstrates the high dynamic range of the fiber scanning display. FIGS. 2I-2K are greyscale images of RGB letters with 3D effects in distinct colors. FIGS. 2L and 2M are AR imaging examples showing floating virtual images of a shield logo and gadget icons immersed in the real world, respectively. The virtual image forms approximately 1 meter away from the camera. The slight blurriness as seen on the corner of FIG. 2M is caused by coma aberration. FIG. 2N shows a three-primary-color image displaying RGB letters in greyscale that is captured in a VR mode. FIG. 2O shows an H-letter-embodied shield logo in seven colors, of which three are primary RGB colors defined by the laser sources and the other four realized by color mixing. As an AR mode demonstration, FIG. 2P shows a virtual image of RGB letters in three distinct colors that is immersed in a real-world scene.

First, one challenge of a high numerical aperture metalens is limited field of view (FOV). The metalens can correct monochromatic aberrations and chromatic aberration for normal incidence. Higher order aberrations can limit the system's FOV to be <10°. An RGB metalens doublet can be designed that can also correct coma aberration, field curvature as well as transverse chromatic aberration for oblique incident beams. RGB achromatic metalenses can also work with micro LCD/LED displays by increasing the size of the metalens to centimeter scale and employing the fabrication techniques that are feasible for large scale and mass production at low cost. For example, fabrication techniques can include i-line stepper lithography (365 nm), KrF deep-UV stepper lithography (248 nm), ArF deep-UV immersion lithography (193 nm), and nanoimprint lithography for large metalens fabrication. Bulky optical elements, such as an achromatic quarter waveplate and an optical combiner, can be replaced by compact metasurfaces. The footprint of the fiber scanning display can be reduced towards a portable device. The eye's depth of cue can be resolved in an AR system by implementing a multifocal RGB achromatic metalens or actively tuning the distance between the metalens and the display.

A meta-optics-based system for VR/AR applications can include an RGB doublet metalens that can also correct for coma aberration for oblique incident beams. The meta-optics-based system for VR/AR applications can include a centimeter scale metalens and micro LCD/LED displays. The centimeter scale metalens can be achieved by employing the fabrication techniques that are feasible for large scale and mass production at low cost. For example, fabrication techniques can include i-line stepper lithography (365 nm), KrF deep-UV stepper lithography (248 nm), ArF deep-UV immersion lithography (193 nm), and nanoimprint lithography for large metalens fabrication. The meta-optics-based system for VR/AR applications can include metasurfaces that replace conventional bulky optical elements; for example, conventional achromatic quarter waveplate is based on bulky birefringent crystals, and can be replaced by compact metasurfaces. The meta-optics-based system for VR/AR applications can include components to resolve the eye's depth of cue such as multi-focal RGB-achromatic metalenses or motorized housing for display. The footprint of the fiber scanning display could be reduced towards a portable device. The systems and methods described herein can be used for applications such as communications, education, traffic navigations, and medical surgeries.

The metalens can include $TiO_2$ nanofin structures. The building block library was built up by using rigorous coupled-wave analysis (RCWA) method and consists of ~60K nanostructures with different geometries. The height of the $TiO_2$ nanofin is 600 nm and the periodicity of the unit cell is 400 nm, in this example embodiment. The incident light is set as left-handed circularly polarized and the monitored transmitted light is in the conjugate right-handed circularly polarization state.

The metalens presented can be fabricated on fused silica substrate in the following procedures. The fused silica substrate can be spin-coated with a layer of 600-nm thick positive electron beam resist (EBR, Zeon Chemicals, ZEP-520A) followed by an additional layer of conductive polymer (Showa Denko, ESPACER 300) to avoid charging effects during electron beam lithography. After that, the patterns can be defined using electron beam lithography (Elionix, ELS-F125) and the exposed sample was then developed in o-xylene. Next, around 210-nm thick amorphous $TiO_2$ can be deposited directly onto the developed sample using atomic layer deposition (Cambridge Nanotech, Savannah). The $TiO_2$ not only filled in the trenches of the exposed e-beam resist, but can also be coated on top of the unexposed sample area. The excess film of the $TiO_2$ can be removed by using reactive ion etching (Oxford Instrument, PlasmaPro 100 Cobra 300) and the etchant can be a mixture of $CHF_3$, $O_2$ and Ar gas. Upon the completion of the etching processing, the electron-beam resist can be stripped off by soaking the sample in Remover PG (MicroChem Corporation) for 24 hours.

Figure 3:
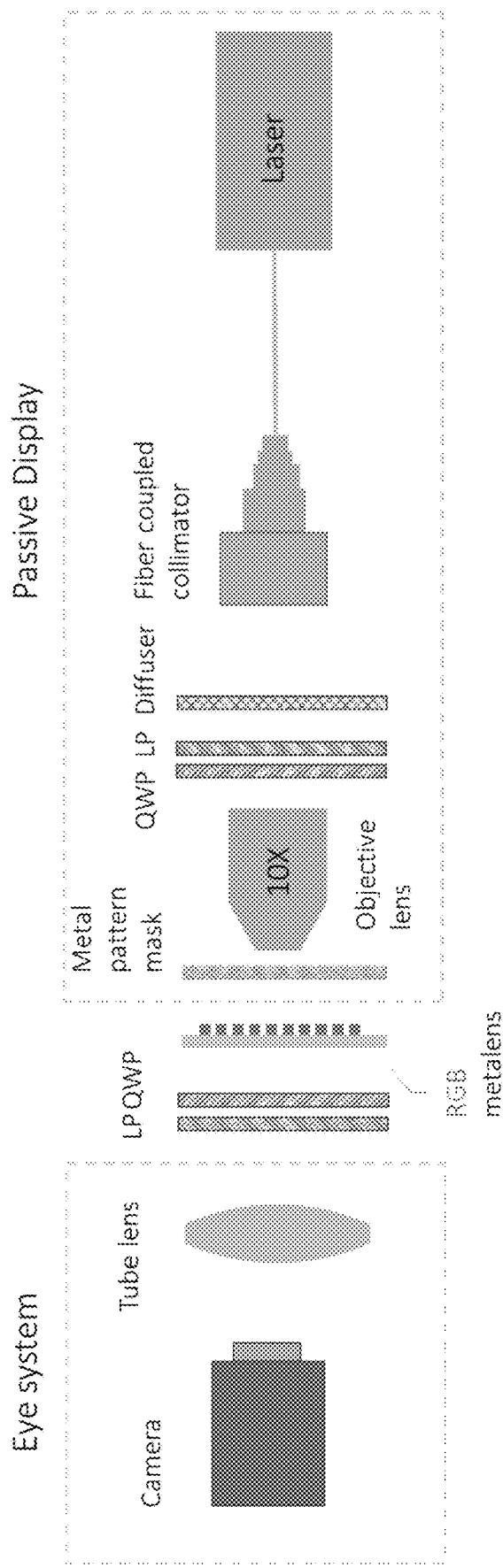
FIG. 3 illustrates a virtual reality setup based on an achromatic metalens and a passive display, according to an embodiment.

FIG. 3 illustrates a virtual reality setup based on an achromatic metalens and a passive display. FIG. 3 illustrates a schematic of a virtual reality setup based on an achromatic metalens, a passive display and a mimicked eye system. Some elements in the passive display part are a metal pattern mask and a laser source. The metal pattern mask defines the display image and the hollow dots on the metal mask mimics the pixel grains as could be found in conventional LCD/LED displays. The collimated light from the laser mimics the back-light illumination. A diffuser can be placed in between the laser and metal pattern mask to reduce speckles and a pair of wire grid polarizer (Thorlab, WP25M-VIS) and achromatic quarter waveplate (Thorlab, AQWPO5M-600) can be used to generate the left-handed circularly polarized light. The collimated beam can be slightly focused onto the metal pattern mask by a Mitutoyo objective (10× magnification, NA=0.28). The RGB achromatic metalens can be placed within focal length from the metal pattern mask. The eye system can include a tube lens (Thorlab, TTL180-A) that mimics an eye lens crystal and a sCMOS camera (PCO, panda 4.2) that mimics retina. The eye system can include a tube lens that mimics a human eye crystal lens and a camera that mimics retina. In the passive display, a metal pattern mask mimics a passive screen that defines static display images, and diffused light from a laser source can be used for back illumination. Another pair of wire grid polarizer (Thorlab, WP25M-VIS) and quarter waveplate (Thorlab, AQWPO5M-600) that is configured in the crossed polarization state can be placed after the metalens to reduce background. The image shown on the metal pattern mask forms a magnified virtual image that appears at a far distance as compared to the image's location in the fiber scanning plane by the RGB metalens. This virtual image is captured by the eye system.

Figure 4A:
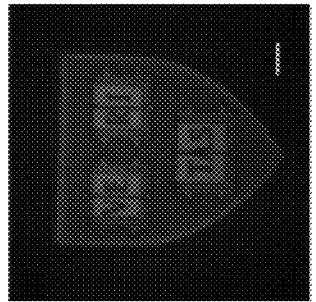
FIGS. 4A-4K illustrate virtual reality images of a metal mask pattern with 720 nm diameter hollow dots, according to some embodiments.
Figure 4B:
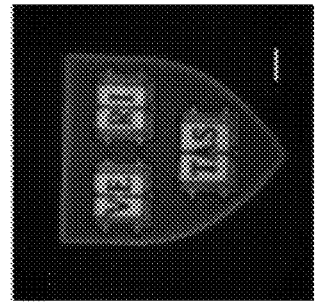
Figure 4C:
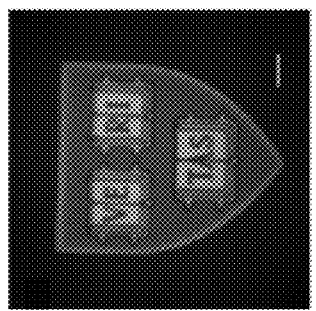
Figure 4D:
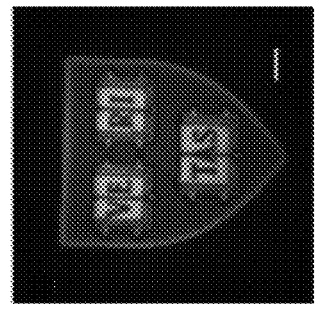
Figure 4E:
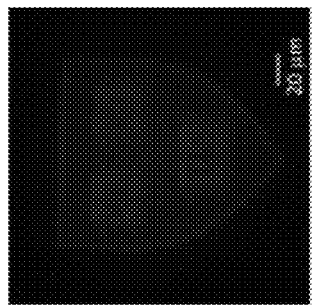
Figure 4F:
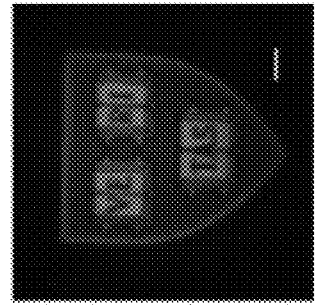
Figure 4G:
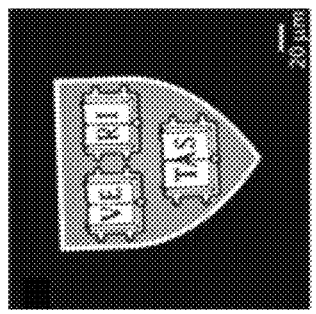
Figure 4H:
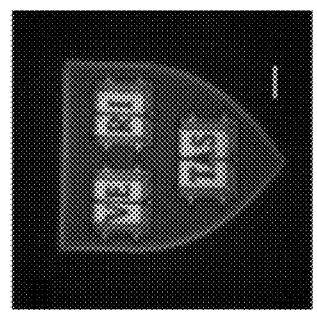
Figure 4I:
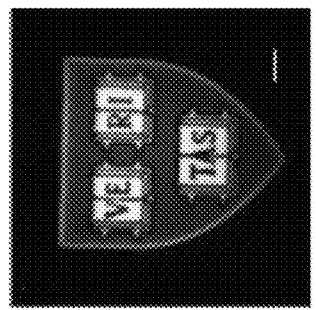
Figure 4J:
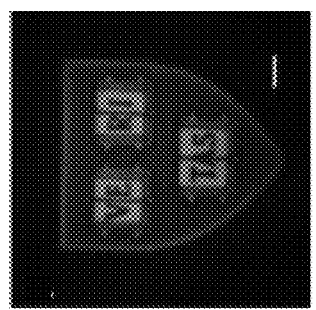
Figure 4K:
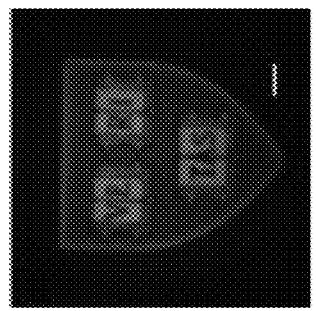

FIGS. 4A-4K illustrate virtual reality images of a metal mask pattern with 720 nm diameter hollow dots. FIG. 4A illustrates an optical microscope image of a fabricated metal mask that mimics a passive display. The metal mask can include a layer of aluminum film deposited on a fused silica substrate. The white bright area is the etched part and the dark black area is the remaining unetched metal. The grey area inside the shield is composed of etched hollow dots of 720 nm in diameter and 800 nm in periodicity. The scale bar is 20 µm. The aluminum pattern mask can be fabricated on a fused silica substrate. The white area corresponds to the exposed fused silica substrate where the metal is etched away, and the black area is the remaining unetched metal. Inside the shield outline are hollow dots of different size and periodicity to mimic pixels as commonly seen in conventional LCD/LED displays, which create a greyscale image. The smallest line feature size of the mask is 0.9 µm. FIGS. 4B-4D illustrate a virtual reality mode demonstration showing the images captured by the sCMOS camera (that mimics the retina) at three design wavelengths of 470 nm (FIG. 4B), 548 nm (FIG. 4C), and 647 (FIG. 4D) nm through the achromatic metalens with NA=0.3. The metalens may be placed in front of the display and a tube lens that mimics the eye lens crystal. The scale bar is 20 µm. FIGS. 4E-4J illustrate virtual reality imaging results of the fabricated metal mask pattern in synthesized colors that are realized by mixing two of the blue, green, and red primary incident light. The size of the hollow dots is slightly beyond the diffraction limit of the metalens with NA=0.3, and thus it forms a uniform greyscale background. For example, FIG. 4E is the result under the illumination of a mixture of the blue and the green light. FIG. 4J is the result under the illumination of a mixture of the green and the red light. The scale bar is 20 µm. FIG. 4K illustrates a virtual reality imaging result in white color that is synthesized by mixing the above three incident light of the primary RGB colors. The scale bar is 20 µm.

Figure 5A:
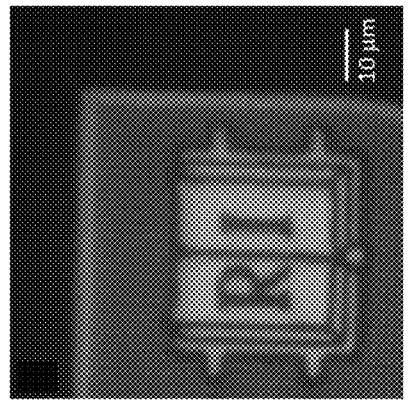
FIGS. 5A-5F illustrate virtual reality images of a metal mask pattern with 1300 nm diameter hollow dots, according to some embodiments.
Figure 5B:
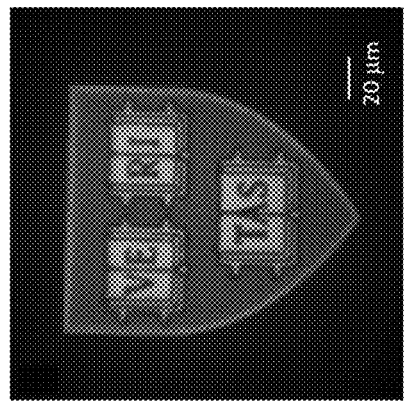
Figure 5C:
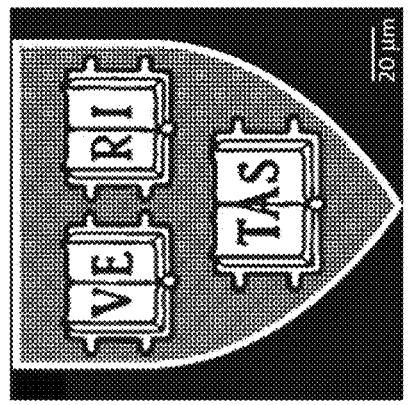
Figure 5D:
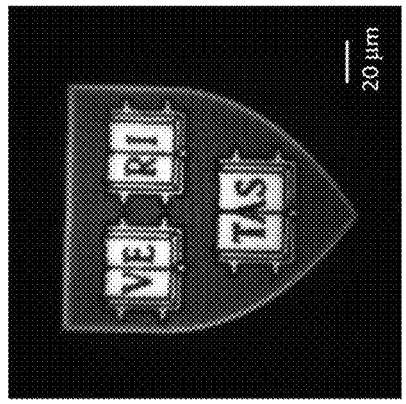
Figure 5E:
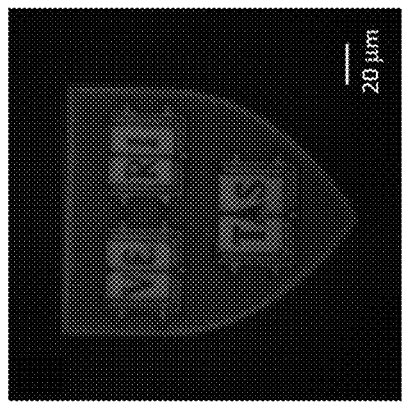
Figure 5F:
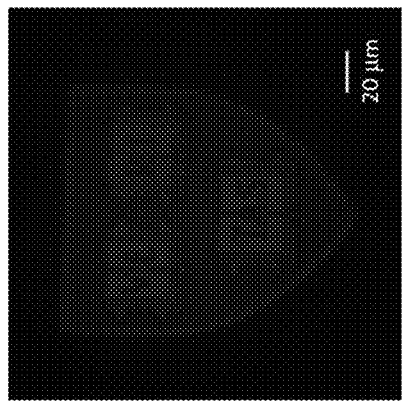

FIGS. 5A-5F illustrate virtual reality images of a metal mask pattern with 1300 nm diameter hollow dots. FIG. 5A illustrates an optical microscope image of a fabricated metal mask pattern. The hollow dots inside the shield have diameter of 1300 nm and periodicity of 1600 nm. The scale bar is 20 µm. FIG. 5B illustrates a virtual reality imaging result of the fabricated metal mask pattern under the illumination of green light at 548 nm. The scale bar is 20 µm. In comparison with the VR imaging results of the mask pattern filled with 720 nm-diameter hollow dots, the resolvable hollow dots in this mask can cause pronounced pixel grains feelings. This implies that the pixel size of a desired VR display should be smaller than the retina resolution limit after being magnified by metalens in order to achieve high resolution image without showing pixel grain features. FIG. 5C illustrates the zoomed-in view of FIG. 5B, which shows details at the corner of the shield pattern. The hollow dots are clearly resolved by the metalens and thus causes feeling of pixel grains. The scale bar is 10 µm. FIGS. 5D and 5E illustrate virtual reality imaging results of the fabricated metal mask pattern under the illumination of blue light at 470 nm (FIG. 5D) and red light at 648 nm (FIG. 5E). The scale bar is 20 µm. FIG. 5F illustrates a virtual reality imaging result of the fabricated metal mask pattern under the white light illumination that is synthesized by combining the blue, green and red primary incident light. The scale bar is 20 µm.

Figure 6:
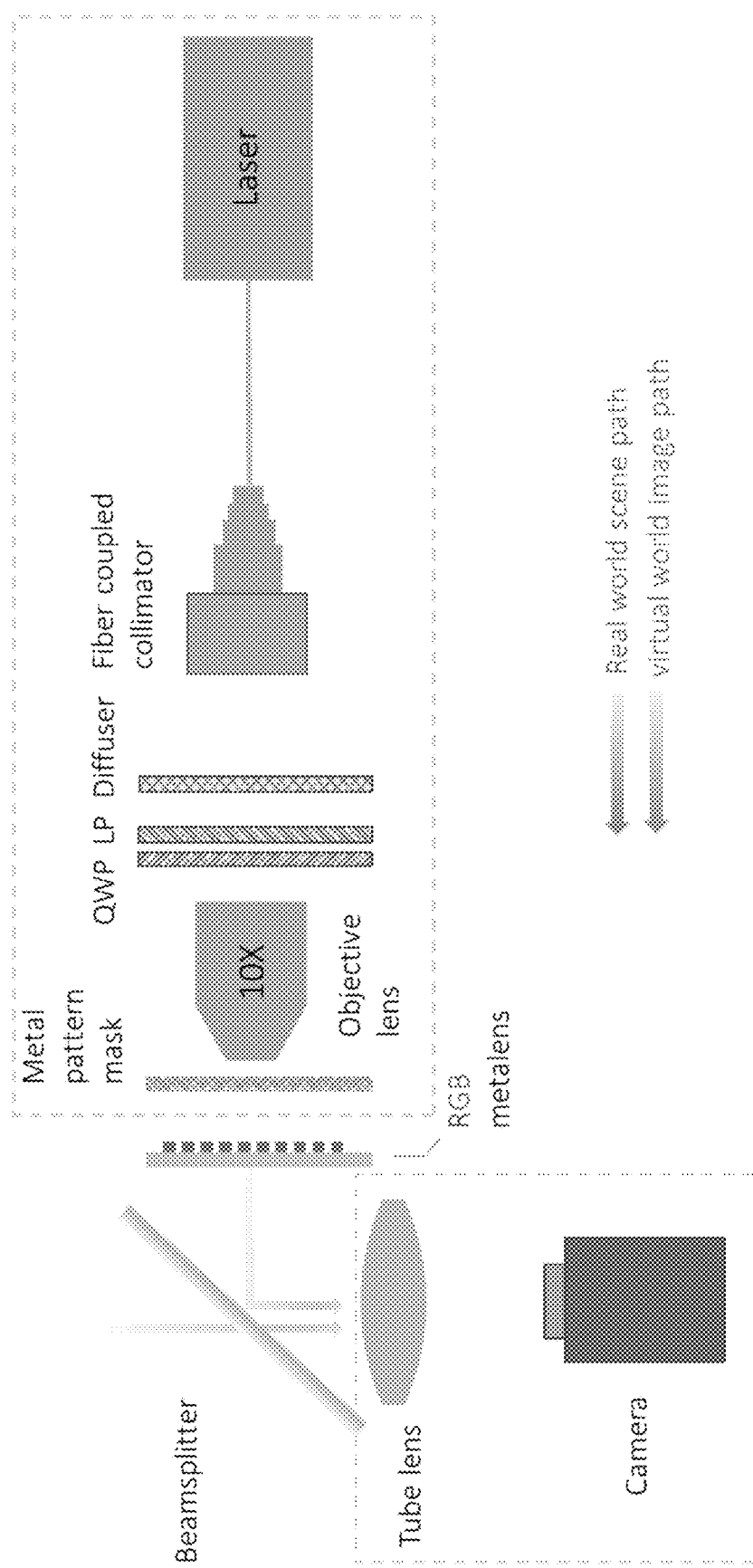
FIG. 6 illustrates a virtual reality setup based on an achromatic metalens and a passive display, according to an embodiment.

FIG. 6 illustrates a virtual reality setup based on an achromatic metalens and a passive display. FIG. 6 illustrates a schematic of an augmented reality setup based on an achromatic metalens, a beamsplitter, a passive display and a mimicked eye system. In this setup, the passive display and the mimicked eye system can be configured in the same way as the virtual reality setup (FIG. 3). Different from the virtual reality setup, the optical axis of the metalens may be perpendicular to the optical axis of the tube lens. A 45-degree beamsplitter (Thorlab, BSW16) can be placed between the RGB metalens and the eye system and functions as an optical combiner. The real-world scene can directly pass through the beam splitter followed by the tube lens and projected onto the sCMOS camera following the optical path marked in blue color. The virtual world scene defined by the metal pattern mask can form a magnified image that appears at far distance by the RGB metalens. This virtual image can be deflected by the beam splitter and projected onto the sCMOS camera following the optical path marked in orange color (e.g., extending from the metalens to the beamsplitter, then to the Tube lens). In this way, the real-world scene and the virtual-world scene can be combined.

Figure 8:
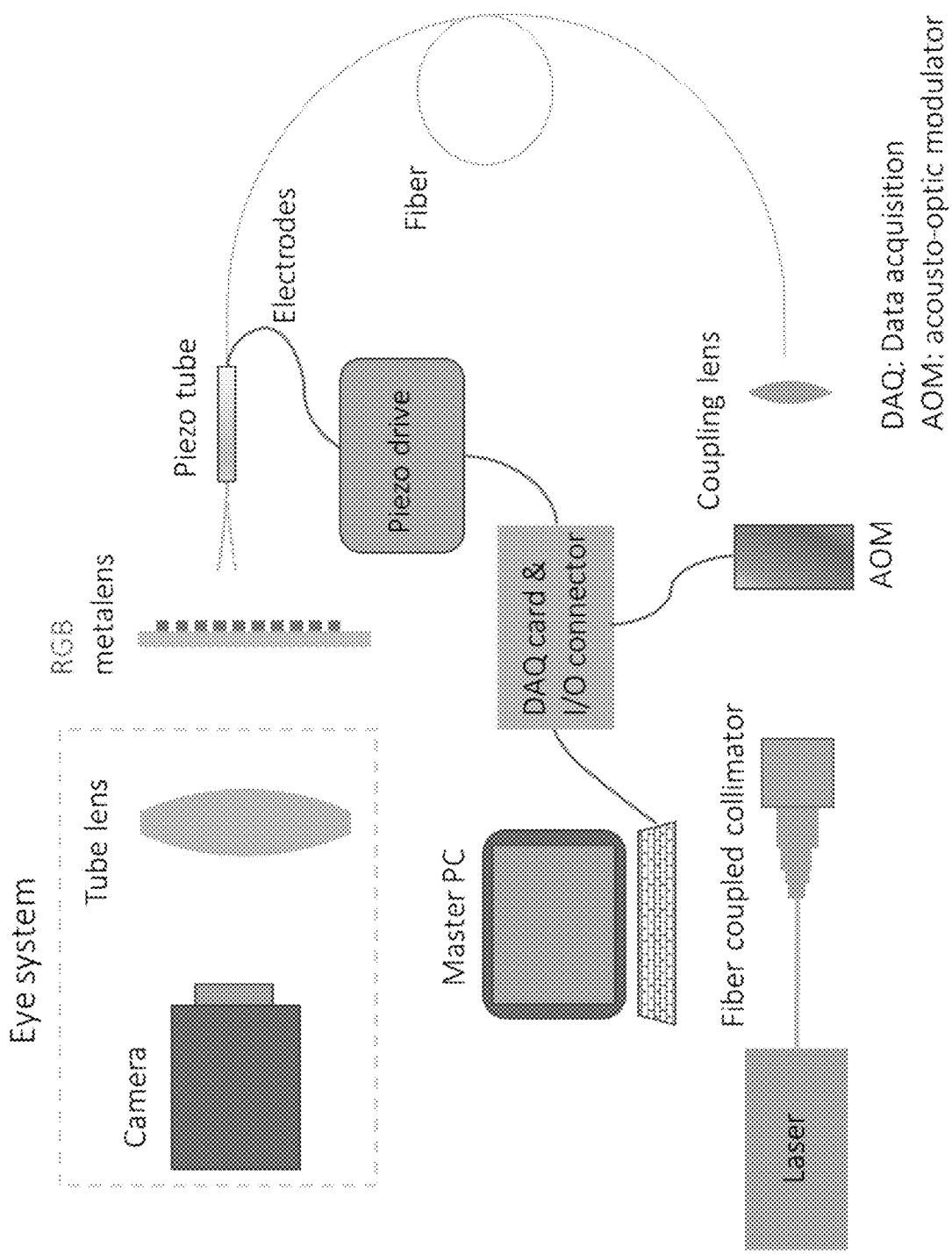
FIG. 8 illustrates a schematic of a virtual reality system setup based on an achromatic metalens and a fiber scanning display, according to an embodiment.

FIGS. 7A-7K illustrate augmented reality images of merged virtual objects and a real-world scene. FIG. 7A illustrates an optical microscope image of a fabricated "H" shield logo metal pattern that mimics a passive display. The metal mask can include a layer of aluminum metal deposited on a fused silica substrate. The white area corresponds to the part where the metal is etched away, and the black area is the remaining metal that is unetched. The scale bar is 20 µm. FIG. 7B illustrates a real-world scene consisting of a plush toy of cow and a plush toy of squirrel. FIGS. 7C-7E illustrate three image examples of augmented reality demonstration that illustrate mixtures of the virtual floating images projected by the passive display and the real-world scene. The virtual floating image is in the primary blue, green and, red color of 470 nm, 548 nm, and 648 nm, respectively. FIGS. 7F-7K illustrate examples of augmented reality demonstration with the virtual floating images in other colors that are synthesized by mixing the incident light in primary blue, green and red color. FIGS. 7C-7K demonstrate AR imaging examples, which show "H" logo virtual images in various colors are merged seamlessly in the real-world scene consisting of two mascots FIG. 8 illustrates a schematic of a virtual reality setup based on an achromatic metalens, a single-color fiber scanning display and a mimicked eye system. In the fiber scanning display part, the laser beam can be collimated by a fiber coupled collimator and then passes through an acousto-optic modulator (ISOMET, 1205C-1). The acousto-optic modulator can be used to modulate the incident laser beam and can generate a laser beam with a certain temporal intensity response. The modulated laser beam may then be coupled into one end of the optical fiber (Coherent, nufern 630-HP) by a coupling lens (Thorlab, AC080-020-A-ML). The coupled laser beam can travel along the optical fiber and can emit out from the other end. The other end of the fiber can be mounted within a piezo tube (Physik Instrumente, ceramic PIC 151, OD=1.5 mm, ID=0.9 mm, L=15 mm) that is used to control the spatial movement of the fiber tip. The piezo tube can be connected with a piezo drive (PiezoDrive, TD250-INV) through two pairs of orthogonal electrodes where voltage signals are applied. The spatial movement of the fiber tip and the temporal intensity modulation of the incident beam can be synchronized by a data processing center that consists of a master PC, a data acquisition card, and an I/O connector (National Instrument, BNC-2110). The master PC may be used for image processing. The master PC can convert a display pattern to input signals for the acousto-optic modulator and the piezo drive. The input signals are then distributed to the hardware through the data acquisition card and the I/O connector. An image that reflects the design display pattern can form at the plane where the fiber tip scans. The RGB metalens may be placed within focal length from the scanning plane. It forms a magnified virtual image at far distance by the RGB metalens, and this virtual image is captured by the eye system.

FIGS. 9A-9H illustrate examples of geometric patterns formed by the fiber scanning display without modulation of the incident light. FIG. 9A shows a line pattern rotated by 45 degrees. FIG. 9B shows a circle pattern. FIG. 9C shows an ellipse pattern. FIG. 9D shows a double circle (e.g., double ring) pattern. FIG. 9E shows a double ellipses pattern. FIG. 9F shows a ring pattern. FIG. 9G shows a solid rectangular pattern. FIG. 9H shows a solid square pattern. The scale bar is 20 µm.

FIGS. 10A-10L illustrate virtual reality results of patterns formed by the fiber scanning display with a Lissajous scanning method. FIGS. 10A-10D show virtual reality imaging results of a "B" letter, a "HARVARD" letter and two shield logos under the illumination of blue light of 470 nm with temporal modulation of the incident light. The scale bar is 20 µm. FIGS. 10E-10H show virtual reality imaging results of a "G" letter, a "HARVARD" letter and two shield logos under the illumination of green light of 548 nm with temporal modulation of the incident light. The scale bar is 20 µm. FIGS. 10I-10L show virtual reality imaging results of a "R" letter, a "HARVARD" letter and two shield logos under the illumination of red light of 648 nm with temporal modulation of the incident light. The scale bar is 20 µm.

The voltage signals applied on the electrodes that are soldered onto the piezo tube have the following form: $V_{x(y)}(t)=A_{x(y)}(t)\sin(2\pi f_{x(y)}t+\phi_{x(y)})$, where $A_{x(y)}$ is the voltage amplitude in x(y) direction, $f_{x(y)}$ is the modulation frequency, and $\phi_{x(y)}$ is the initial phase. In the spiral scanning method, the voltage amplitude changes in time as a triangle waveform, the scanning frequencies are the same for two electrodes ($f_x=f_y$), and the initial phase difference is 90 degrees ($\phi_y-\phi_x=\pi/2$). One challenge of the spiral scanning method is the non-uniform light intensity distribution as the fiber scans a circular two-dimensional space without modulation of the incident light. This issue can arise due to a number of reasons. For example, the fiber scans in a fixed frequency (e.g., the amount of time that the fiber take to complete a round trip is fixed). As the voltage applied increases, the radius of the circular trajectory that the scanning fiber follows increases. The effective scanning speed can increase as the fiber scans from the center to the edge. If the incident light intensity is kept the same, the scanning pattern can look brighter in the center part and dimmer at the outer edge. To compensate the non-uniform light intensity distribution, the signal applied to the acousto-optic modulator (AOM) is modulated, which controls the incident light intensity, as the fiber scans from the center to the edge in the following form: $V=V_0+V_{max}(r(t)/r_{max})^\beta$, where $V_0$ is the AOM base operating voltage, $V_{max}$ is the AOM maximum operating voltage, r(t) is the radius of the fiber scanning trajectory as function of time, and $r_{max}$ is the maximum fiber scanning radius. $\beta$ is a nonlinear coefficient. The initial value of $\beta$ is set to be 1, and this value is fine tuned in practice to achieve uniform light intensity distribution. The input light intensity can be tuned to a higher value as the fiber scans around the center and tuned to a lower value as the fiber scans over a larger-radius circle.

FIGS. 11A-11L illustrate virtual reality results of patterns formed by the fiber scanning display with a spiral scanning method. FIGS. 11A-11D show virtual reality imaging results of a "B" letter, a "HARVARD" letter and two shield logos under the illumination of blue light of 470 nm with temporal modulation of the incident light. The scale bar is 20 µm. FIGS. 11E-11H show virtual reality imaging results of a "G" letter, a "HARVARD" letter and two shield logos under the illumination of green light of 548 nm with temporal modulation of the incident light. The scale bar is 20 µm. FIGS. 11I-11L show virtual reality imaging results of a "R" letter, a "HARVARD" letter and two shield logos under the illumination of red light of 648 nm with temporal modulation of the incident light. The scale bar is 20 µm.

Figure 11A:
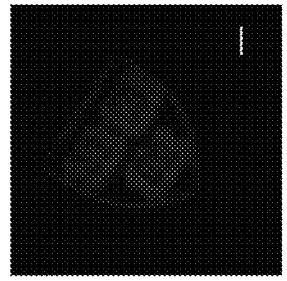
FIGS. 11A-11L illustrate virtual reality results of patterns formed by the fiber scanning display with a spiral scanning method, according to some embodiments.
Figure 11B:
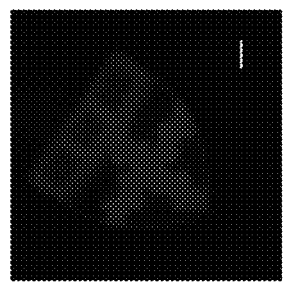
Figure 11C:
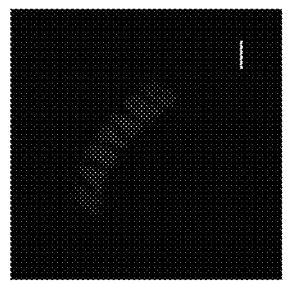
Figure 11D:
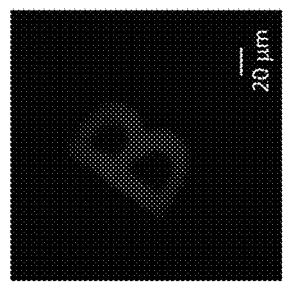
Figure 11E:
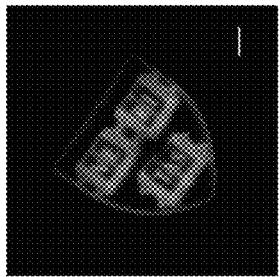
Figure 11F:
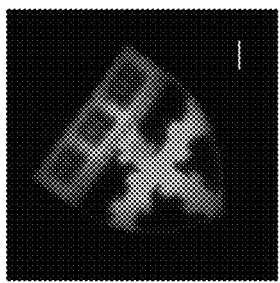
Figure 11G:
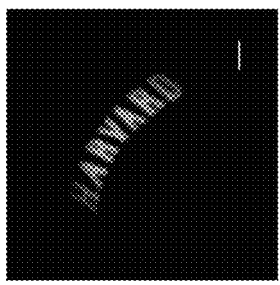
Figure 11H:
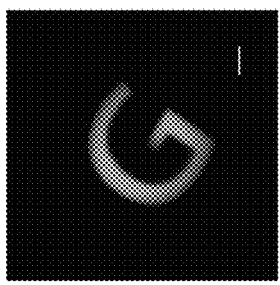
Figure 11I:
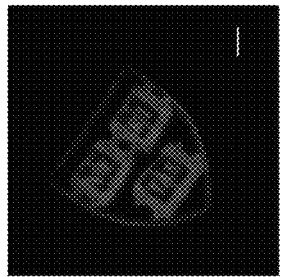
Figure 11J:
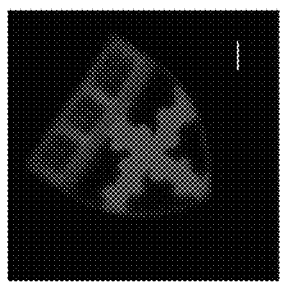
Figure 11K:
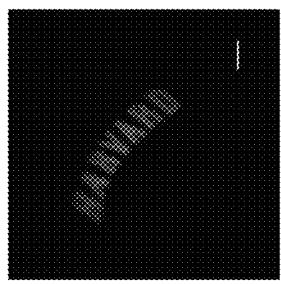
Figure 11L:
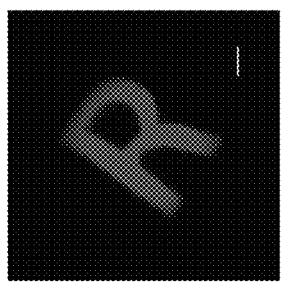

The light intensity distribution in most parts of the patterns is uniform. However, non-uniform light distribution is observed at the centers of the displayed patterns, for example, as shown in FIG. 11G. The non-uniformity also shows up at the edges of the displayed patterns, for example, in FIGS. 11A, 11E, and 11I. Overall, the uniformity achieved by the spiral scanning method is not as good as the uniformity achieved by the Lissajous scanning method. Another issue observed in the spiral scanning method is the image distortion in the scanning center. This is because the fiber movement lags the applied signals when the fiber accelerates from zero speed, and its scanning speed does not immediately relax to zero when the applied voltage decreases to zero. As a result, it is challenging to properly display the center part of the pattern. This issue could be potentially solved if one could track the trajectory of the fiber tip in real time as it scans and compensate the trajectory errors.

Figure 12:
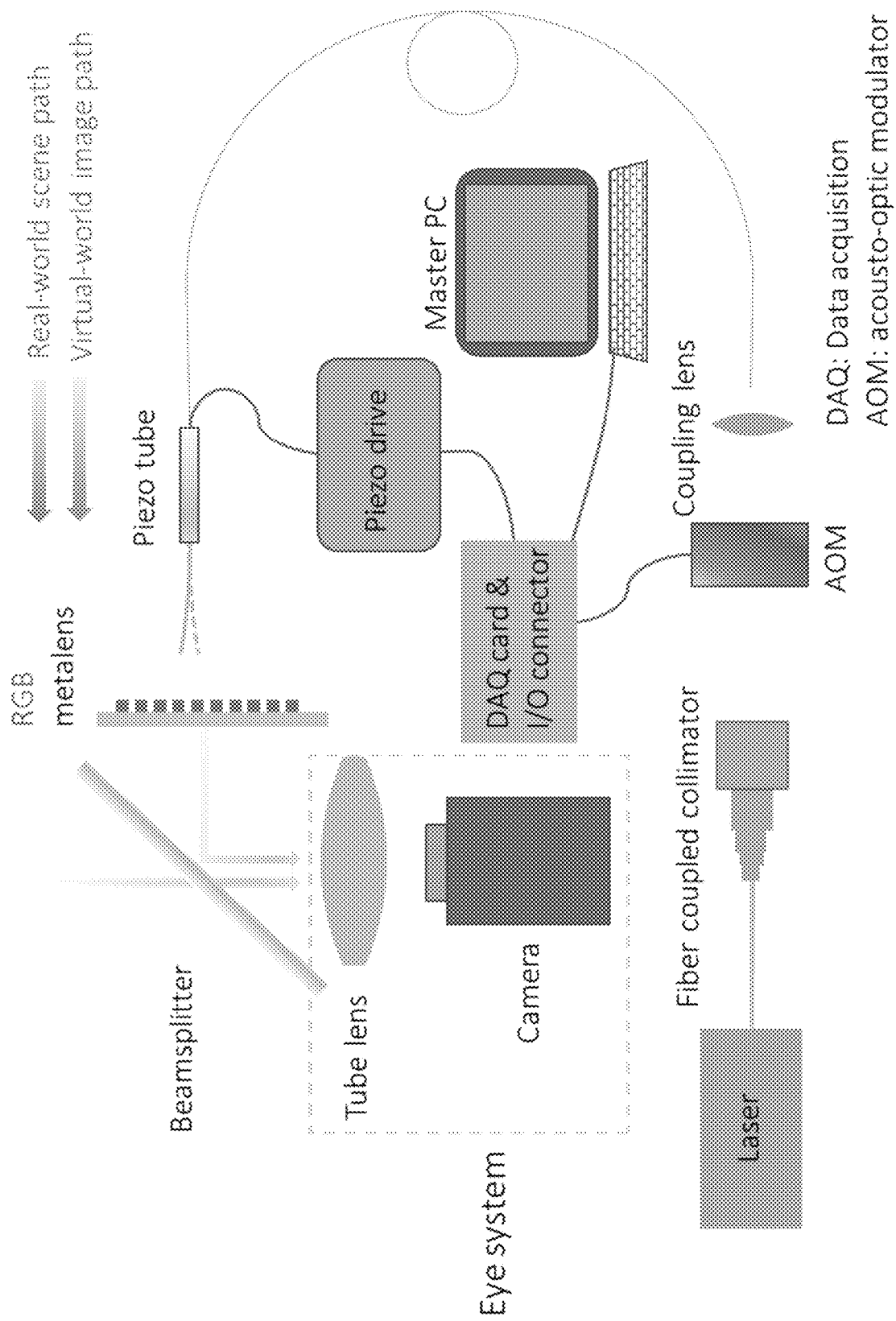
FIG. 12 illustrates a schematic of an augmented reality setup, according to an embodiment.

FIG. 12 illustrates a schematic of an augmented reality setup. The augmented reality setup can be based on an achromatic metalens, a beamsplitter, a single-color fiber scanning display, and a mimicked eye system. The configuration of the single-color fiber scanning display system is the same as the virtual reality setup in FIG. 8. In the augmented reality setup, the optical axis of the RGB metalens can be perpendicular to that of the eye system. An optical combiner, (e.g., a 45-degree beamsplitter (Thorlab, BSW16)), can be placed between the RGB metalens and the tube lens. The image displayed in the fiber scanning plane can form a virtual image that is a magnified version of the image and appears at a far distance as compared to the image's location in the fiber scanning plane. This virtual image can be captured by the eye system after reflection by the beamsplitter following the optical path (virtual-world image path) marked in orange color (e.g., extending from the metalens to the beamsplitter, then to the Tube lens). At the same time, a real-world scene can directly pass through the beamsplitter and project onto the camera following the optical path (real-world scene path) as marked in green color (e.g., coming from the top through the beamsplitter, towards to the Tube lens). In this way, the real-world scene and the virtual-world scene can be combined.

Figure 13:
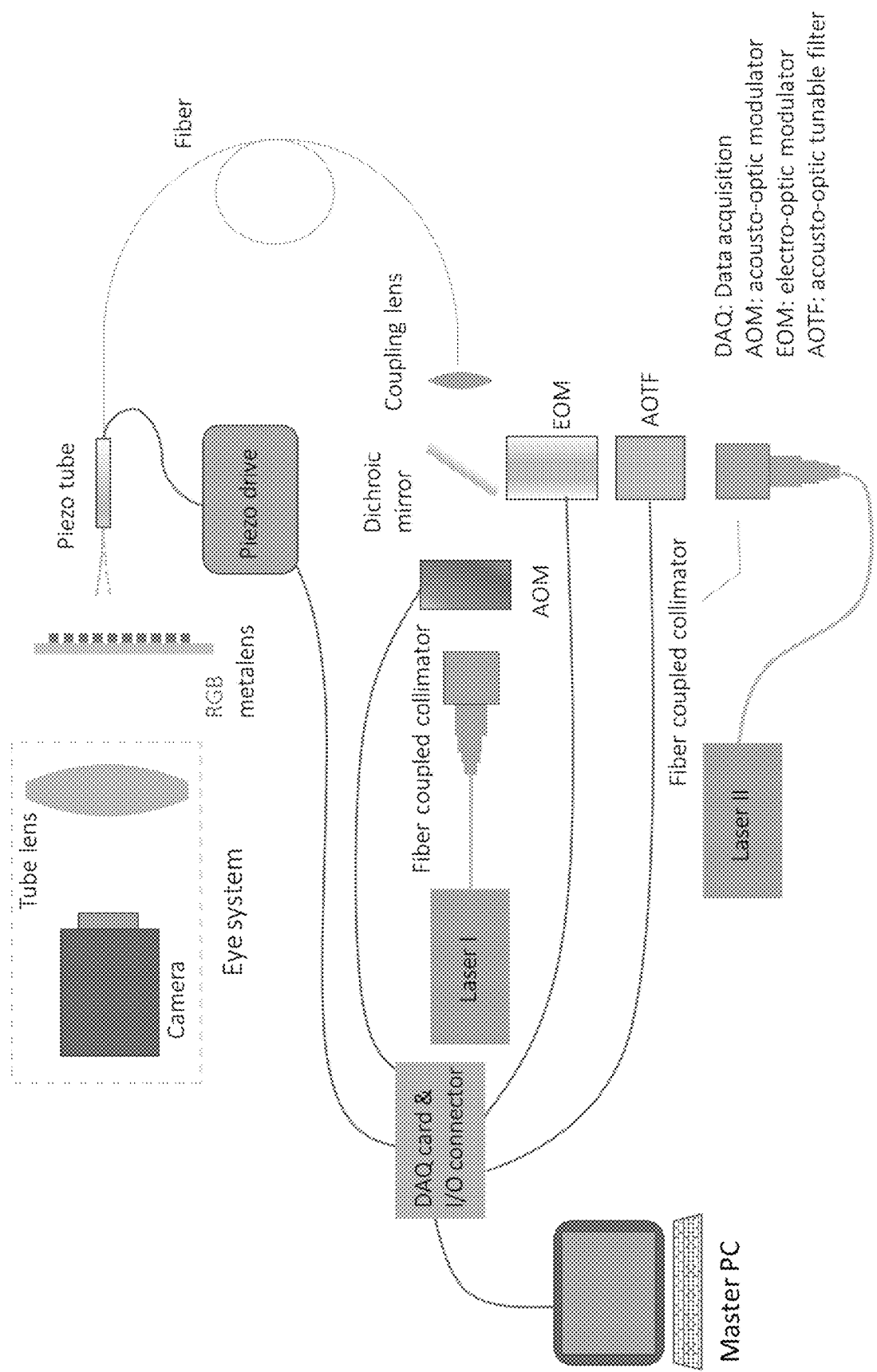
FIG. 13 illustrates a schematic of a virtual reality setup, according to an embodiment.

FIG. 13 illustrates a schematic of a virtual reality setup. The virtual reality setup can be a full-color virtual reality setup based on an achromatic metalens, a beamsplitter, a full-color fiber scanning display, and a mimicked eye system. There can be two laser sources located in two separate optical paths in the full-color fiber scanning display system. Laser I can output blue light and laser II can output green and red light. In one optical path, the blue laser beam from the laser I can be collimated by a fiber coupled collimator (RC12APC-P01) and then can pass through an acousto-optic modulator (AOM: ISOMET, 1205C-1) where its intensity can be temporally modulated. The modulated blue laser can transmit through a dichroic mirror (Thorlab, DMSP505) and can be focused onto one end of the fiber by a coupling lens (Thorlab, AC080-020-A-ML). In the other optical path, the green and red laser beam emitted from the laser II can be collimated by a fiber coupled collimator (RC04APC-P01). The collimated laser beams can pass through an acousto-optic tunable filter (AOTF) where the output wavelengths can be temporally selected. The output laser beam can then pass through an electro-optic modulator (EOM: ConOptic, 350-80) and its intensity can be temporally modulated. The modulated laser beam can then be reflected by the dichroic mirror and can combine with the modulated blue laser beam. They can be focused onto the same fiber by the same coupling lens (Thorlab, AC080-020-A-ML). The combined laser beams can travel through the optical fiber and emit out from the other end of the fiber. The scanning trajectory of the fiber tip can be controlled by a piezo tube that is connected to a piezo drive (PiezoDrive, TD250-INV) through two pairs of orthogonal electrodes. The piezo drive (PiezoDrive, TD250-INV), acousto-optic modulator (ISOMET, 1205C-1), electro-optic modulator (ConOptic, 350-80) and the acousto-optic tunable filter can be synchronized through a data processing center that consists of a master PC, a data acquisition card and a I/O connector (National Instrument, BNC-2110). The master PC can compute images to display and can output required input signals for the hardware (piezo drive, AOM, EOM and AOTF). The input signals can then be distributed to the hardware through the data acquisition card and the I/O connector. A full-color image that reflects the design formed at the fiber scanning plane. The RGB metalens can be placed within a focal length from the scanning plane. The display image can pass through the RGB metalens and forms a magnified virtual image. The virtual image can appear at far distance and can be captured by the eye system that consists of a tube lens and a sCMOS camera (PCO, Panda 4.2).

Figure 14:
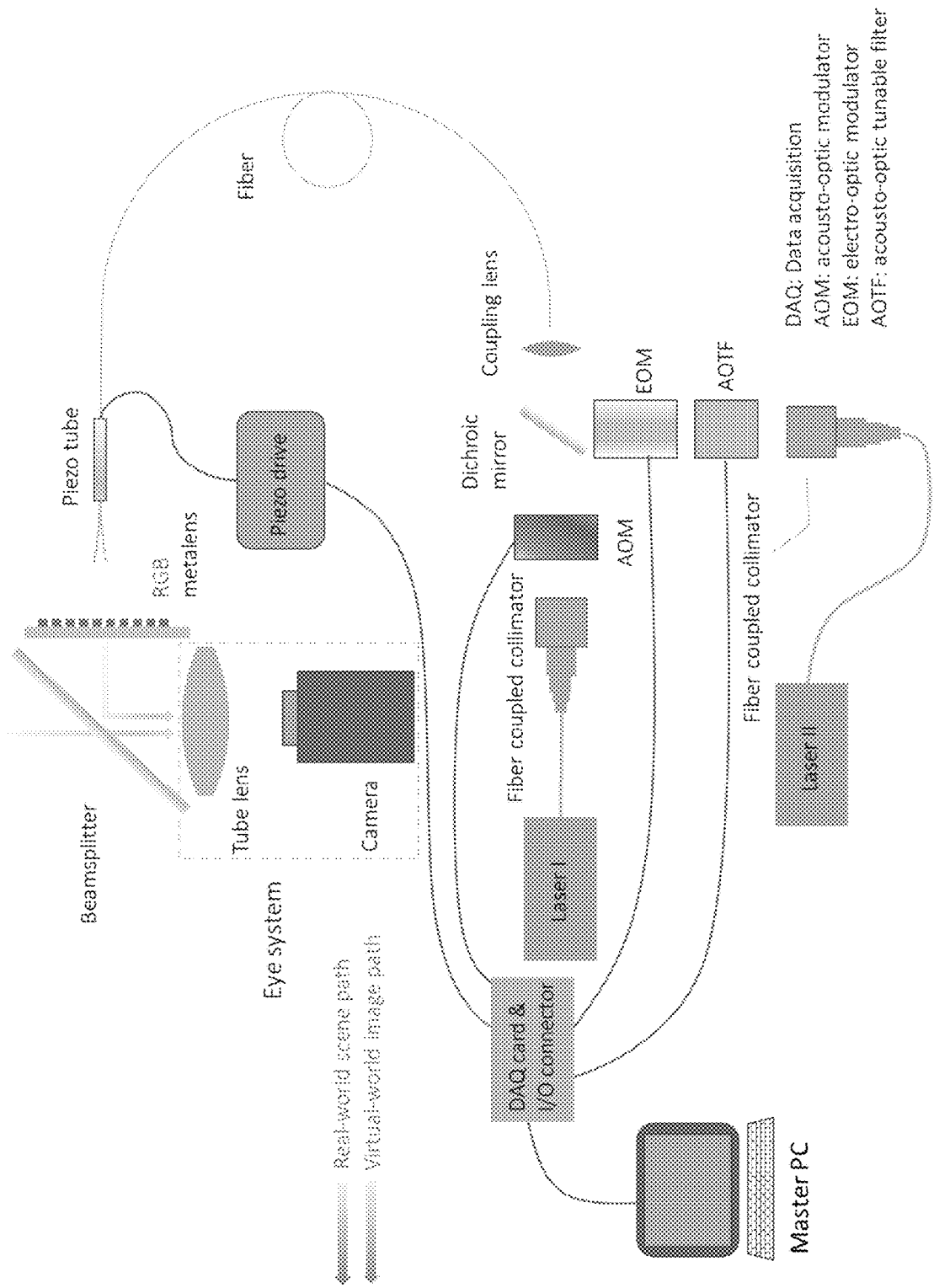
FIG. 14 illustrates a schematic of an augmented reality setup, according to an embodiment.

FIG. 14 illustrates a schematic of an augmented reality setup. The augmented reality setup can be based on an achromatic metalens, a beamsplitter, a full-color fiber scanning display, and a mimicked eye system. The configuration of the full-color fiber scanning display system can be the same as the virtual reality setup in FIG. 13. In the augmented reality setup, the optical axis of the RGB metalens can be perpendicular to that of the eye system. An optical combiner (e.g., a 45-degree beamsplitter (Thorlab, BSW16)), can be placed between the RGB metalens and the tube lens. The RGB metalens can be placed within focal length from the scanning plane. The image displayed in the fiber scanning plane can pass through the RGB metalens and can form a virtual image. This virtual image can be magnified and can appear at far distance. It can be captured by the eye system after reflection by the beamsplitter following the optical path (virtual-world scene path) marked in orange color (e.g., extending from the metalens to the beamsplitter, then to the Tube lens). At the same time, a real-world scene can directly pass through the beamsplitter and can project onto the camera following the optical path (real-world scene path) marked in green color (e.g., coming from the top through the beamsplitter, towards to the Tube lens). In this way, the real-world scene and the virtual-world scene can be combined.

FIGS. 15A-15C illustrate schematics of a fiber scanning display system based on fiber optics. FIG. 15A illustrates schematic drawing of a fiber scanning display system that is based on fiber optics. The modulation of R/G/B incident light can be realized by fiber-coupled acousto-optic modulators. FIG. 15B illustrates a schematic drawing of a fiber scanning display system, in which the output R/G/B laser beam is directly modulated by a laser control system. FIG. 15C illustrates a schematic drawing of an on-chip fiber scanning display system. Examples of components that are integrated on chip are on-chip light sources, bandpass filters (e.g. resonator-type bandpass filters), electro-optic modulators (e.g. MZI-type EOMs), and a chip-to-fiber coupler.

Several strategies can be used to integrate the fiber scanning display into a portable VR/AR device (e.g., miniaturizing the footprint). The configuration of the display could be simplified by adapting fiber optics that include fiber-coupled laser diodes, fiber-coupled acousto-optic modulators (AGMs), and a fiber combiner (FIG. 15A). In such a system, three incident beams of RGB colors can come from fiber-coupled laser diodes and propagate inside fibers. Their intensities can be modulated by the fiber-coupled AOMs, and then three beams can be merged together by the fiber combiner before coupling into the scanning fiber.

The size of the fiber scanning display can be reduced by getting rid of the AOMs and directly modulating the R/G/B laser diodes via a laser control system (FIG. 15B). The modulated incident beams can combine into the scanning fiber through a fiber combiner.

An on-chip platform can integrate R/G/B laser sources, narrowband filters, high-speed modulators, and a chip-to-fiber coupler (FIG. 15C). For example, room-temperature electrically pumped GaN/InGaN-based blue laser diodes can be grown on a silicon chip. White light emitting diodes can be realized when combined with phosphors that convert blue light to broadband emitting light in the visible. The emission spectrum of a GaN/InGaN-based laser diode can be tuned over the visible band ranging from blue to red by varying indium composition in InGaN. The emission spectrum can also be tuned by controlling the size of InGaN dots in a nanowire laser diode. Other types of on-chip laser diodes operating in the visible have also been demonstrated. For example, a ZnO/Al plasmonic waveguide nanolaser can be monolithically fabricated on a sapphire substrate and emits blue light at room temperature. Lithium Niobite ($LiNbO_3$) can be another material platform for the on-chip visible light sources. Supercontinuum generation can range from 400 nm to 2400 nm in a $LiNbO_3$ waveguide. A micro-ring/-disk resonator working in the visible with high quality factor can be used for the on-chip filter. The possible material platform include but not limits to silicon nitride ($Si_3N_4$), polymer, aluminum nitride (AlN), and $LiNbO_3$. For example, a low-loss $LiNbO_3$ micro-ring resonator can a high-quality factor of ~10 million at 637 nm wavelength. $LiNbO_3$ is also a promising material platform for on-chip modulator due to its large electro-optic coefficient. A $LiNbO_3$ Mach-Zehnder interferometer-type on-chip intensity modulator can be used. This intensity modulator can achieve a voltage-length product of 1.6 V·cm and an electro-optical bandwidth of 10 GHz. The $LiNbO_3$ thin film could also be bound onto silicon chips for photonic integration. Chip-to-fiber coupling techniques can be used for end-fire coupling, diffraction grating-based optical coupling, etc. The fiber material and facet shape, as well as waveguide geometry can be tuned for high coupling efficiency and broad operation bandwidth.

Figure 16:
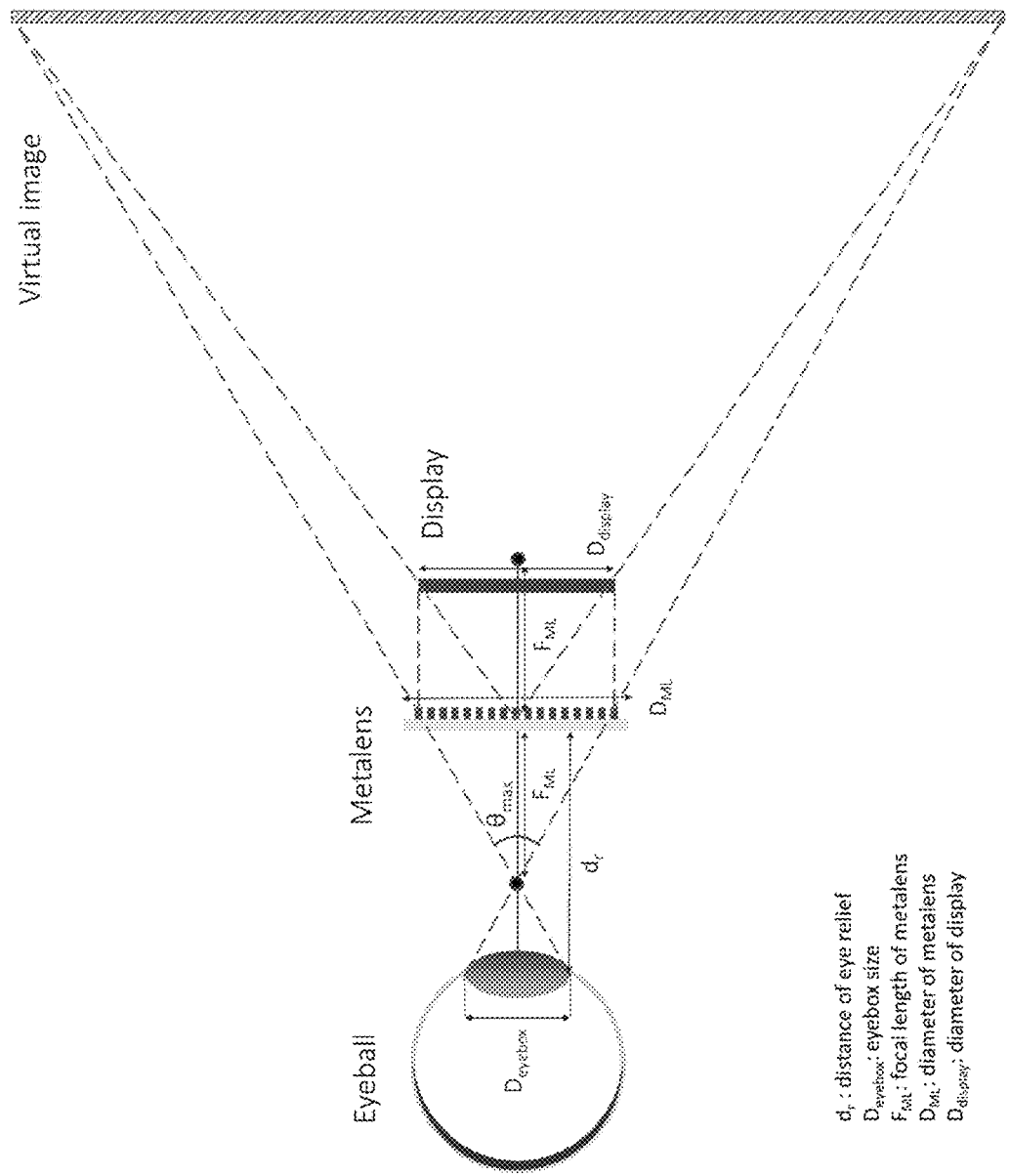
FIG. 16 illustrates a schematic of a VR system, according to an embodiment.

FIG. 16 illustrates a schematic of a VR system. The VR system includes an eyeball, a metalens, and a display to illustrate examples of system design parameters. The display can be placed within the focal length of the metalens. The size of the display can be close to the size of the metalens. The display can be placed close to the metalens focal point. The virtual image can form at a very far distance beyond the metalens focal point. The size of the metalens can depends on its focal length $F_{ML}$ and NA in the following way: $D_{display} \approx D_{ML} = 2F_{ML} \tan(\sin^{-1} NA)$. The distance between eye crystal lens and the metalens can be defined as eye relief distance $d_r$. To capture whole virtual image, the eye relief distance may satisfy the following equations:

$$d_r < \frac{D_{eyebox} + D_{ML}}{2 \tan\frac{\theta_{max}}{2}} = \frac{D_{eyebox} + D_{ML}}{2 \tan(\sin^{-1} NA)},$$

where $D_{eyebox}$ is the eyebox size, $D_{ML}$ is the metalens diameter. The normal eyebox size is about 5 mm. FOV of the system $\theta_{max}$ can be related to NA of the metalens in the following way: FOV~$\theta_{max}$=2 sin$^{-1}$ NA. Thus, the NA of the metalens can be important for FOV, and the size of the metalens can be larger than display size. The form factor of the VR system can depend on $D_{ML}$, $F_{ML}$, and $D_{display}$. A VR system with large FOV and small form factor can include a high numerical aperture (high-NA) optical eyepiece with good imaging quality and a miniaturized display with high resolution. The combination of meta-optics and the fiber scanning display can open a new path to a future VR device.

One challenge of high-NA metalens is its higher order aberrations, which can limit FOV and degrade imaging quality. The metalenses described herein can correct monochromatic aberrations (spherical aberration and astigmatism) and chromatic aberration under normal incidence. To achieve large FOV, the metalens can correct higher order aberrations. The RGB-achromatic metalens doublet described herein can correct monochromatic aberrations (spherical aberration and astigmatism) and chromatic aberration under normal incidence. The RGB-achromatic metalenses can addresses higher order aberrations (coma and field curvature) and chromatic aberration under oblique incidence.

Figure 17A:
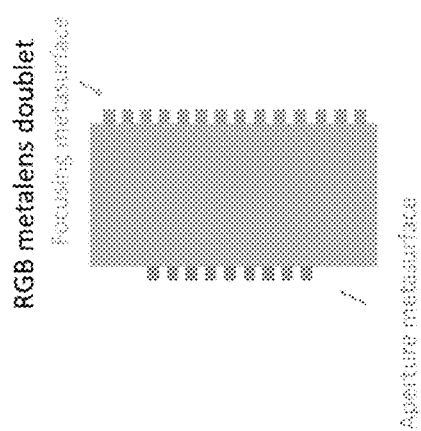
FIG. 17A illustrates an RGB metalens doublet, according to an embodiment.
Figure 17B:
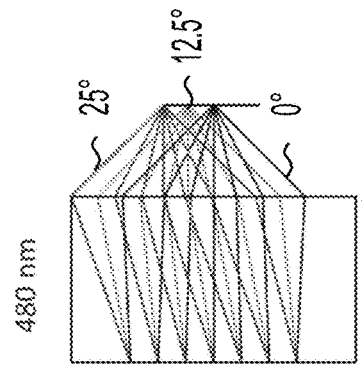
FIGS. 17B-17D illustrate ray tracing diagrams of the metalens doublet shown in FIG. 17A at various incident wavelengths, according to some embodiments.
Figure 17C:
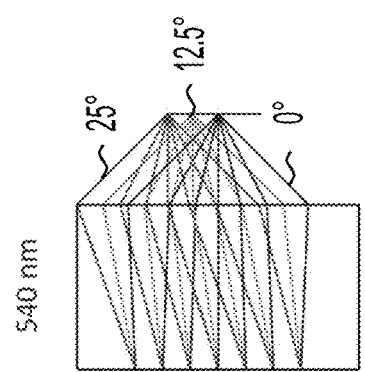
Figure 17D:
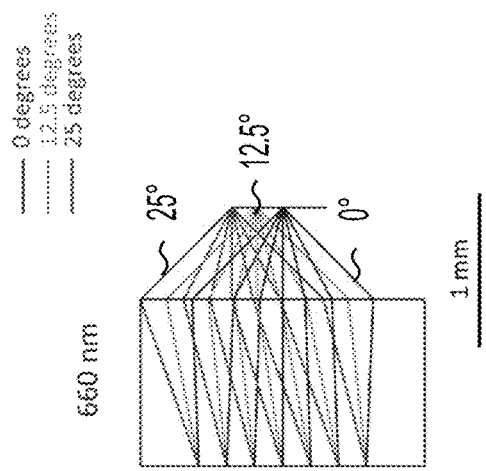

FIG. 17A illustrates an RGB metalens doublet. The RGB metalens doublet can include two metasurfaces that are patterned on both sides of a fused silica substrate. The metasurface facing the incident light is named "aperture metasurface", and the other one is called "focusing metasurface". These two metasurfaces together can form a telecentric configuration. The diameter of the aperture metasurface and the focusing metasurface is 1 mm and 1.8 mm, respectively. The thickness of the substrate is 1 mm. The RGB metalens doublet can achieve field of view of 50 degrees and NA of ~0.7. FIGS. 17B-D show the ray tracing diagrams of the metalens doublet at incident wavelengths of 480 nm, 540 nm, and 660 nm, respectively. For each wavelength, optical ray tracings under three different incident angles of 0, 12.5, and 25 degrees are shown. The focal length, which is defined as the distance between the focusing metasurface and the image plane, is kept the same in FIGS. 17B-17C. Under normal incidence (0 degrees), three wavelengths are focused to the same center point at the image plane indicating achromatic focusing. At each wavelength, oblique incident rays at three angles are converged to three focal points at the same focal plane (image plane). This can indicate that the metalens doublet corrects coma and field curvature. In comparison, a refractive lens can focus incident light of different angles to different focal lengths due to the curvature of lens surface and thus cause aberration of field curvature. Furthermore, at a certain incident angle, the positions of focal points at different wavelengths are also the same. This can indicate that the metalens doublet corrects chromatic aberration under different oblique incidence, which is also known as transverse aberration.

Figure 18A:
FIGS. 18A-18B illustrate phase profiles, according to some embodiments.
Figure 18B:
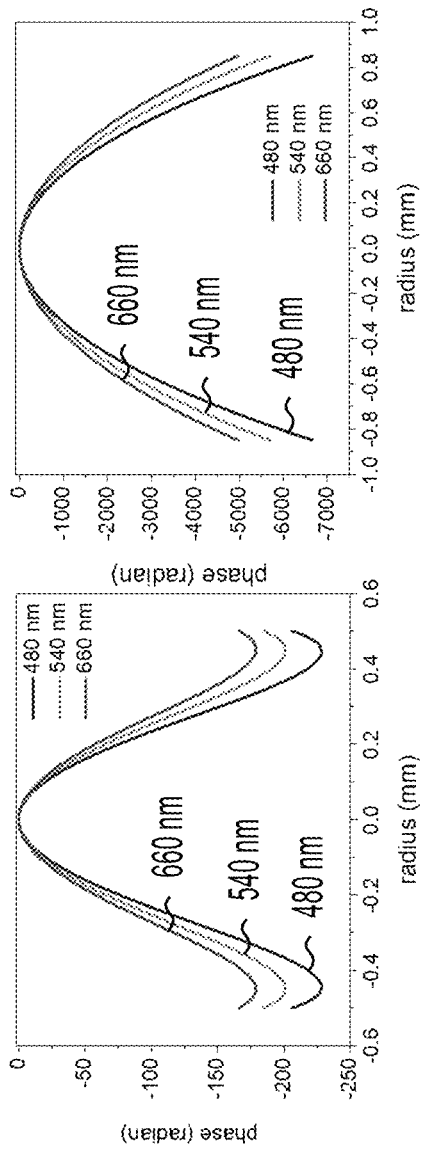
Figure 18E:
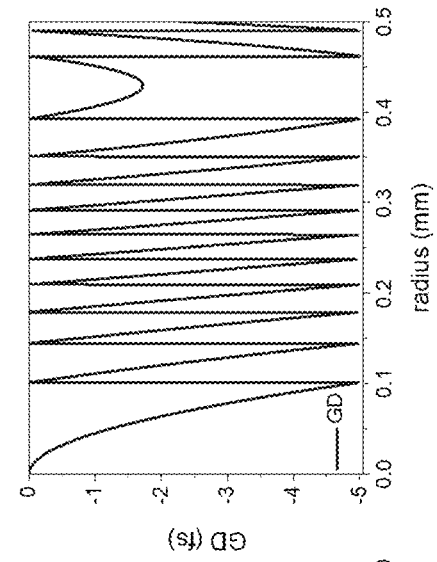
FIGS. 18C-18E illustrate group delay profiles, according to some embodiments.
Figure 18D:
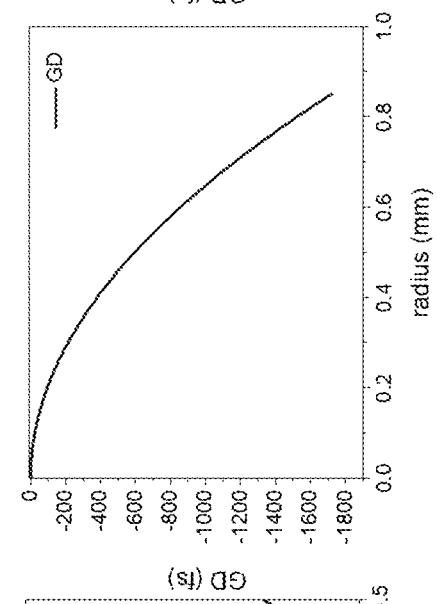
Figure 18C:
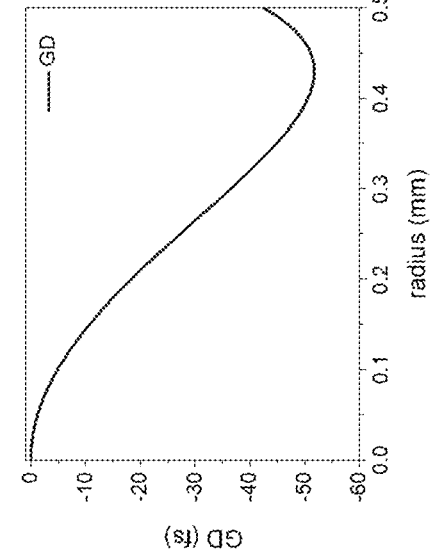

To realize above focusing performance, the phase profiles of aperture metasurface and focusing metasurface at different wavelengths can be engineered independently. FIG. 18A illustrates the phase profiles of the aperture metasurface at three wavelengths (e.g., RGB wavelengths). FIG. 18B shows phase profiles of the focusing aperture metasurface. The corresponding group delay profiles of the aperture metasurface and the focusing metasurface as function of radius are shown in FIGS. 18C and 18D. Considering the maximum group delay constrained by a single layer metasurface, dispersion engineering and zone interference engineering can be used. The metasurfaces can be divided into multiple zones. FIG. 18E shows an example of an aperture metasurface that consists of 13 zones. The maximum group delay range within each zone can be bounded by 5 fs, which can be satisfied. The group delay range can be satisfied within each zone. The phase discontinuities at zone boundaries can be engineered according to constructive zone interference.

The performances of different display techniques including LCD, LED, LCOS, DLP, and fiber scanning displays can be compared and shown in Table 1. The minimum pixel size of the fiber scanning display can depend on the confined mode diameter inside a fiber. The fiber core size can be approximately 4 μm. The mode diameter can be further reduced to sub-micrometers by tapering a fiber core or employing a nanojet technology. Such a pixel size may not achievable by other display techniques, like LCD/LED or MEMS scanner. A frame rate of a fiber scanning display can be 60 fps. The contrast ratio can be ~2×10$^3$ if an acousto-optic modulator (AOM) is used, and it can be further increased if the laser output is modulated. The output beam intensity can be tuned zero if the laser is switched off to display a dark spot. The dynamic range of the fiber scanning display can be determined by the performance of AOM, and a common value is 11 bits.

TABLE 1

Comparison of different display techniques

| | Liquid-crystal display (LCD)/ Light-emitting diode (LED) panels | Liquid Crystal on Silicon (LCoS) | Digital light processing (DLP) panels | Fiber scanning display |
|---|---|---|---|---|
| Pixel size | 6-11 μm | ~10 μm | 7-10 μm | <4 μm depending on fiber core size |
| Frame rate | 60 fps | 60 fps | 60 fps | 60 fps |
| Brightness (light source) | LCD: moderate (CCFL*) LED: high (LED) | Moderate to High (CCFL or LED) | High (laser) | High (laser) |
| Contrast ratio | LCD: ~10$^3$:1 LED: >10$^5$:1 | 4 × 10$^3$:1 | 2 × 10$^3$:1 | >2 × 10$^3$:1 |
| Dynamic range | LCD: 8-bit microLED: 10-bit | 10-bit | 10-bit | 11-bit (AOM modulation) |
| Color gamut | | See FIGS. 19A-19E | | |

The color gamut of different displays can be compared in a CIE chromaticity diagram as shown in FIG. 19A. The fiber scanning display with an LCD display and an OLED display can be compared. The DCI-P3 standard is also shown for reference. The wavelengths in units of nm shown on the diagram contour represent pure colors. RGB light emissions from a display has certain bandwidth, and the RGB light emission spectra are represented by three individual data points. These data points locate inside the CIE chromaticity diagram contour, which means the RGB emissions from a display are not pure. The area within the boundary by connecting RGB spectra data points defines color gamut, and it indicates the color that can be realized by mixing RGB light sources. The larger the area, the wider the color gamut. FIGS. 19C-19E show measured RGB emission spectra from an LCD screen, an OLED screen, and lasers used in our fiber scanning display. The corresponding RGB color points are labeled in star, square, and cross, respectively. The detailed color coordinates of light sources used in different displays are summarized in the table as shown in FIG. 19B. The fiber scanning display of the present disclosure can cover a wider area in the CIE chromaticity chart compared to LCD and OLED displays and cover the DCI-P3 color standard, which is widely used for evaluating advanced mobile displays. The fiber scanning display color gamut can be further increased if the lasers sources at 467 nm, 532 nm, and 630 nm are used.

Conventional quarter waveplates can be bulky. The thickness can be ~1 mm. Commercial QWPs can be based on birefringent crystals, which have a different refractive index between two orthogonal axes. The performance of such an achromatic QWP can be limited. The retardance between two orthogonal axes can depend on wavelength, and can be due to the material dispersion. A metasurface-based compact achromatic QWP can offer superior performance than commercial products.

A schematic of an achromatic QWP metasurface is shown in FIG. 20A. The achromatic QWP metasurface consists of two layers of metasurface on top of transparent fused silica substrate. The top layer is a $TiO_2$ nanofin, and the bottom layer consists of a $SiO_2$ nanofin that is embed in $TiO_2$ matrix. The total thickness of double layered metasurface is less than 1 mm. FIGS. 20B-20E show simulation results of an optimized metasurface out of a library containing ~120K elements. The solid line in FIG. 20B shows simulated retardance between TE and TM incident light over the visible band in units of $\pi$. For reference, the dashed line is the target achromatic QWP performance with constant retardance of constant $0.5\pi$. The simulation results can be close to target profile showing achromatic performance. The maximum discrepancy as defined $$\max\left|\Delta\phi(\lambda) - \frac{\pi}{2}\right|$$

is $0.19\pi$, and the average discrepancy as defined $$\text{avg}\left|\Delta\phi(\lambda) - \frac{\pi}{2}\right|$$

is $0.02\pi$. FIG. 20C shows transmission spectra of TE and TM incident light. The maximum transmission difference between TE and TM incident light defined as $\max|\Delta T(\lambda)|$ is 0.09, and the average transmission difference defined as $\text{avg}|\Delta T(\lambda)|$ is 0.04. FIG. 20D shows the conversion efficiency from a linear polarized light to an LCP (RCP) polarized light. The conversion efficiency is as high as 0.998, and average conversion efficiency is 0.93. FIG. 20E shows the purity of converted LCP (RCP) output, and the average purity is 0.996 in the visible.

Perception of depth can be a factor for consideration in AR applications because real world scenes can be captured at different distances. Eye's depth of cue can be resolved in the following ways.

A multifocal metalens can be used in an AR system. FIG. 21A shows a schematic drawing of an AR system component that accommodates eye's depth of cue for near and far distance. The metasurface has two RGB-achromatic focal lengths: $F_1$ and $F_2$. It can be achieved by interleaving two types of multi-zone RGB-achromatic metalens by applying design principles described herein (e.g., one designed for LCP incident light and one designed for RCP incident light). A display can be placed within both focal lengths and closer to $F_1$. As a result, two virtual images can form at near and far distance, respectively. The virtual image formed in far distance can be in RCP state, and the virtual image formed in near distance can be in LCP state. FIG. 21B shows details of the display. Here, a metasurface QWP is placed in front of the display. The metasurface QWP consists of interleaved supercells with two orthogonal fast axes orientations; for example, 45 degrees and 135 degrees. The supercells size can be close to a pixel size of the display. Light emitted from a display is usually linearly polarized, and it can be converted to LCP and RCP output beam after passing through the metasurface QWP. The LCP and RCP can carry two separate display images when display pixels behind metasurface supercell A and B are configured for two different images. A virtual image at near or far distance can be viewed when selectively lighting up the display pixels.

Eye's depth of cue can be continuously accommodated by active tuning the relative distance between the metalens and the display. For example, FIG. 22 shows a schematic of an AR system component in which the display is mounted on a motorized stage, and the focal length of the metalens is fixed. When the display is placed close to the focal length of the metalens, for example in position P1, a corresponding virtual image A forms at far distance. When the display moves away from the focal length to position P2, a corresponding virtual image B forms at near distance. A virtual image that forms at intermediate distance can be realized by placing the display between P1 and P2 as well. The display can be mounted on a motorized stage. The distance between the metalens and the display can be adjusted so that both real-world scene and virtual images can be focused onto the CMOS camera. In an AR device, a sensor could be implemented to monitor the eye's contraction and dilation from its surface curvature in order to determine the relative position between the metalens and the display in real time.

At least one aspect of the present disclosure is directed to a display system. The display system can include an optical device. The optical device may include a first zone including or having a first plurality of nanoscale elements. The first plurality of nanoscale elements may include or have a first optical dispersion profile and/or a first orientation. The optical device may include or have a second zone including a second plurality of nanoscale elements. The second plurality of nanoscale elements may include or have a second optical dispersion profile and/or a second orientation. The first orientation and/or the second orientation may be configured according to constructive interference for a plurality of wavelengths and/or a focal length. The nanoscale elements may define an angle-dependent phase profile that imparts a wavevector that varies depending on angles of incidence.

In some embodiments, the optical device may include a third zone. The third zone may include a third plurality of nanoscale elements. The third plurality of nanoscale elements may include or have a third optical dispersion profile and/or a third orientation. In some embodiments, the third orientation is configured according to constructive interference at the plurality of wavelengths and/or the focal length. In some embodiments, the first orientation, the second orientation, and/or the third orientation are configured according to constructive interference for at least a first wavelength, a second wavelength, a third wavelength, and/or the focal length. For example, the wavelengths can correspond to an RGB color scheme. For example, the first wavelength can correspond to red, the second wavelength can correspond to green, and/or the third wavelength can correspond to blue. In some embodiments, the optical device may include more than three zones. For example, the optical device may include 3 zones, 10 zones, 100 zones, 200 zones, 300 zones, 400 zones, 500 zones, 600 zones, 700 zones, etc. The number of zones may not correspond to the plurality of wavelengths.

In some embodiments, the first orientation and/or the second orientation are configured according to constructive interference for at least a first wavelength and/or a second wavelength. In some embodiments, the first optical dispersion profile depends on a shape of each of the first plurality of nanoscale elements. The second optical dispersion profile depends on a shape of each of the second plurality of nanoscale elements. Within a zone, the shapes of the nanoscale elements can be configured (e.g., selected, determined) such that the plurality of wavelengths are focused at the same focal length. Within a zone, the rotations (e.g., orientations, positions, etc.) of the nanoscale elements can be configured such that there is constructive interference for the plurality of wavelengths.

In some embodiments, a cross-section of at least one nanoscale element is rectangular or other polygonal shape. In some embodiments, a cross-section of at least one nanoscale element is elliptical or circular. In some embodiments, a cross-section of nanoscale elements can have a 2-fold rotational symmetry, or more generally, an n-fold rotational symmetry where n is an integer that is 2 or greater than 2.

In some embodiments, nanoscale elements have aspect ratios (e.g., height/width) greater than about one, such as at least about 1.5:1, at least about 2:1, at least about 3:1, at least about 4:1, or at least about 5:1, and up to about 10:1 or greater, or up to about 20:1 or greater. In some embodiments, geometric dimensions (e.g., height/width/length or diameter/height) of nanoscale elements are sub-wavelength, such as about 800 nm or less, about 700 nm or less, or about 600 nm or less.

In some embodiments, the first plurality of nanoscale elements may have a first phase profile. A phase profile can include a representation (e.g., graphic, plot, relationship) of a phase of a periodic function of a variable. The second plurality of nanoscale elements may have a second phase profile. The first phase profile may depend (e.g., collectively) on a rotation of each of the first plurality of nanoscale elements. The second phase profile may depend on a rotation of each of the second plurality of nanoscale elements. The first phase profile may depend (e.g., collectively) on a shape of each of the first plurality of nanoscale elements. The second phase profile may depend on a shape of each of the second plurality of nanoscale elements.

In some embodiments, the first optical dispersion profile may depend on a physical distribution of nanoscale elements of the first plurality of nanoscale elements. An optical dispersion profile can include a representation (e.g., graphic, plot, relationship) of dispersion (e.g., group delay, group delay dispersion, etc.). In some embodiments, the second optical dispersion profile may depend on a physical distribution of nanoscale elements of the second plurality of nanoscale elements.

In some embodiments, a shape of the first zone (e.g., shape of a region or boundary of the first zone, or of the first plurality of nanoscale elements) is different from a shape of the second zone. In some embodiments, the first zone and/or the second zone are concentric rings. The concentric ring shape of the zone can result in a reduction in spherical aberrations and astigmatism, which are general problems for conventional lenses, especially for a single lens. Spherical aberrations and astigmatism may blur and reduce the resolution of an image. In some embodiments, the first plurality of nanoscale elements may include at least one of titanium dioxide, silicon nitride, a polymer, an oxide, a nitride, a sulfide, a pure element, or a combination thereof.

In some embodiments, nanoscale elements are composed of a semiconductor, an oxide (e.g., a metal or non-metal oxide), a nitride (e.g., a metal or non-metal nitride), a sulfide (e.g., a metal or non-metal sulfide), a pure element, or a combination of two or more of these.

In some embodiments, nanoscale elements may include a dielectric material. Examples of suitable dielectric materials include metal and non-metal oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., $TiO_2$)), metal and non-metal nitrides (such as nitrides of silicon (e.g., $Si_3N_4$), boron (e.g., BN), or tungsten (e.g., WN)), metal and non-metal sulfides, and pure elements (e.g., silicon for operation at near-infrared and mid-infrared wavelengths).

In some embodiments, the first plurality of nanoscale elements may include nanopillars (e.g., pillar-like, three-dimensional structures or volumes). In some embodiments, nanoscale elements are slanted nanopillars with a nonzero slant angle with respect to a surface normal of a metasurface grating. In some embodiments, the nonzero slanted angle is about 1 degree or greater, about 2 degrees or greater, about 5 degrees or greater, or about 10 degrees or greater.

In some embodiments, the optical device may include a transmissive substrate including glass or polymer. The first plurality of nanoscale elements and/or the second plurality of nanoscale elements may be disposed on the transmissive substrate. In some embodiments, a substrate is transparent in the visible spectrum, such as a polymer substrate, a glass substrate or one including fused silica. Suitable substrates that are transparent in the visible spectrum can have a light transmittance of at least about 40%, at least about 50%, at least about 60%, at least about 70%, at least about 80%, at least about 85%, at least about 90%, or at least about 95%, over the visible spectrum or a design or working wavelength in the visible spectrum.

Another aspect of the present disclosure is directed to an augmented reality device. The augmented reality device may include a first zone (e.g., of a metalens portion of the augmented reality device). The first zone may include or have a first plurality of nanoscale elements. The first plurality of nanoscale elements may include or have a first optical dispersion profile and/or a first orientation. The augmented reality device may include a second zone (e.g., of the metalens portion). The second zone may include or have a second plurality of nanoscale elements. The second plurality of nanoscale elements may include or have a second optical dispersion profile and/or a second orientation. The augmented reality device may have a waveguide (e.g., scanning fiber device) for transmitting augmented reality information to the first zone and/or the second zone. The first orientation and/or the second orientation are determined based on constructive interference for a plurality of wavelengths and/or a focal length.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A display system, comprising:
    an optical device configured according to constructive interference for a plurality of wavelengths at a focal length;
    a fiber; and
    a controller configured to:
        scan the fiber using a Lissajous scanning method to generate a display, the display disposed within a focal plane of the optical device; and
        modulate light intensity from the fiber;
    wherein the optical device is configured to magnify a display image from the display and form a virtual image.

2. The display system of claim 1, wherein the virtual image is located outside of the focal plane of the optical device.

3. The display system of claim 1, wherein the optical device is configured according to constructive interference for at least three wavelengths.

4. The display system of claim 1, wherein the controller is configured to modulate incident light intensity at one end of the fiber using an acousto-optic modulator or an electro-optic modulator.

5. The display system of claim 1, wherein the controller is configured to modulate light intensity by transitioning between two levels of voltages or multi-levels of voltages.

6. The display system of claim 1, further comprising:
a piezo actuator tube; and
a pair of electrodes connected to the piezo actuator tube;
wherein the fiber is disposed within the piezo actuator tube; and
wherein the controller is configured to apply a voltage to the pair of electrodes to configure a position of at least one end of the fiber.

7. The display system of claim 1, wherein the controller is configured to apply a voltage to a first pair of electrodes of the form:

$$V_x(t)=A_x(t)\sin(2\pi f_x t+\phi_x)$$

and apply a voltage to a second pair of electrodes of the form:

$$V_y(t)=A_y(t)\sin(2\pi f_y t+\phi_y)$$

where $A_x$ is a voltage amplitude in an x-direction, $A_y$ is a voltage amplitude in a y-direction, $f_x$ is an x-direction modulation frequency, $f_y$ is an y-direction modulation frequency, $\phi_x$ is a x-direction initial phase, and $\phi_y$ is a y-direction initial phase.

8. The display system of claim 7, wherein $A_x$ and $A_y$ are constants, the x-direction modulation frequency and the y-direction modulation frequency are different, and the x-direction initial phase and the y-direction initial phase are equal.

9. The display system of claim 1, wherein the fiber is coupled to at least 3 different laser sources.

10. The display system of claim 1, wherein the optical device comprises:
a first zone comprising a first plurality of nanoscale elements, wherein the first plurality of nanoscale elements has a first optical dispersion profile and a first orientation; and
a second zone comprising a second plurality of nanoscale elements, wherein the second plurality of nanoscale elements has a second optical dispersion profile and a second orientation;
wherein the first orientation and the second orientation are configured according to constructive interference for the plurality of wavelengths and the focal length.

11. A display system, comprising:
an optical device configured according to constructive interference for a plurality of wavelengths and a focal length;
a fiber;
a controller configured to:
scan an end of the fiber using a Lissajous scanning method to generate a display;
modulate light intensity from the fiber; and
form a display image that passes through the optical device;
an optical combiner configured to reflect the display image from the optical device and form a virtual image.

12. The display system of claim 11, the optical combiner configured to allow a real-world image to pass through the optical combiner.

13. The display system of claim 11, wherein the optical device is configured according to constructive interference for at least three wavelengths.

14. The display system of claim 11, wherein the controller is configured to modulate incident light intensity at one end of the fiber using an acousto-optic modulator or an electro-optic modulator.

15. The display system of claim 11, wherein the controller is configured to modulate light intensity by transitioning between two levels of voltages or multi-levels of voltages.

16. The display system of claim 11, further comprising:
a piezo actuator tube; and
a pair of electrodes connected to the piezo actuator tube;
wherein the fiber is disposed within the piezo actuator tube; and
wherein the controller is configured to apply a voltage to the pair of electrodes to configure a position of at least one end of the fiber.

17. The display system of claim 11, wherein the controller is configured to apply a voltage to a first pair of electrodes of the form:

$$V_x(t)=A_x(t)\sin(2\pi f_x t+\phi_x)$$

and apply a voltage to a second pair of electrodes of the form:

$$V_y(t)=A_y(t)\sin(2\pi f_y t+\phi_y)$$

where $A_x$ is a voltage amplitude in an x-direction, $A_y$ is a voltage amplitude in a y-direction, $f_x$ is an x-direction modulation frequency, $f_y$ is an y-direction modulation frequency, $\phi_x$ is a x-direction initial phase, and $\phi_y$ is a y-direction initial phase.

18. The display system of claim 17, wherein $A_x$ and $A_y$ are constants, the x-direction modulation frequency and the y-direction modulation frequency are different ($f_x \neq f_y$), and the x-direction initial phase and the y-direction initial phase are equal ($\phi_x=\phi_y$).

19. The display system of claim 11, wherein the fiber is coupled to at least 3 different laser sources.

20. The display system of claim 11, wherein the optical device comprises:
a first zone comprising a first plurality of nanoscale elements, wherein the first plurality of nanoscale elements has a first optical dispersion profile and a first orientation; and
a second zone comprising a second plurality of nanoscale elements, wherein the second plurality of nanoscale elements has a second optical dispersion profile and a second orientation;
wherein the first orientation and the second orientation are configured according to constructive interference for the plurality of wavelengths and the focal length.

* * * * *